US007317770B2

(12) United States Patent
Wang

(10) Patent No.: US 7,317,770 B2
(45) Date of Patent: Jan. 8, 2008

(54) NEAR-OPTIMAL MULTIPLE-INPUT MULTIPLE-OUTPUT (MIMO) CHANNEL DETECTION VIA SEQUENTIAL MONTE CARLO

(75) Inventor: Xiaodong Wang, New York, NY (US)

(73) Assignee: NEC Laboratories America, Inc., Princeton, NJ (US)

(*) Notice: Subject to any disclaimer, the term of this patent is extended or adjusted under 35 U.S.C. 154(b) by 664 days.

(21) Appl. No.: 10/631,991

(22) Filed: Jul. 31, 2003

(65) Prior Publication Data

US 2004/0174939 A1 Sep. 9, 2004

Related U.S. Application Data

(60) Provisional application No. 60/450,777, filed on Feb. 28, 2003.

(51) Int. Cl.
*H03D 1/00* (2006.01)
*H04L 27/06* (2006.01)

(52) U.S. Cl. .................. 375/340; 375/260; 375/267; 375/324; 375/347

(58) Field of Classification Search .............. 375/340, 375/347, 324, 267, 260
See application file for complete search history.

(56) References Cited

U.S. PATENT DOCUMENTS

2002/0034261 A1* 3/2002 Eidson et al. ............... 375/298
2004/0042556 A1* 3/2004 Medvedev et al. ......... 375/260
2006/0188044 A1* 8/2006 Wang et al. ................ 375/347

OTHER PUBLICATIONS

G.J. Foschini and M.J. Gans, On Limits of Wireless Communications in a Fading Environment when Using Multiple Antennas, *Wireless Personal Commun.*, 6(3):311-335, 1998.
I.E. Telatar, Capacity of Multi-antenna Gaussian Channels, *Eur. Trans. Telecommun.*, 10(6):585-595, Nov. 1999.
C.N. Chuah, D.N.C. Tse, J.M. Kahn, and R.A. Valenzuela, Capacity Scaling in MIMO Wireless Systems Under Correlated Fading, *IEEE Trans. Inform. Theory*, 48(3):637-650, Mar. 2002.
P.W. Wolniansky, G.J. Foschini, G.D. Golden, and R.A. Valenzuela, V-BLAST: An Architecture for Realizing Very High Data Rates Over the Rich-Scattering Wireless Channel, In *Proc. 1998 Int. Symp. Sig. Sys. Elect.* (*ISSSE'98*), Pisa, Italy, Sep. 1998.

(Continued)

*Primary Examiner*—Ted Wang

(57) ABSTRACT

A class of soft-input soft-output demodulation schemes for multiple-input multiple-output (MIMO) channels, based on the sequential Monte Carlo (SMC) framework under both stochastic and deterministic settings. The stochastic SMC sampler generates MIMO symbol samples based on importance sampling and resampling techniques, while the deterministic SMC approach recursively performs exploration and selection steps in a greedy manner. By exploiting the artificial sequential structure of the existing simple Bell Labs Layered Space Time (BLAST) detection method based on nulling and cancellation, the proposed algorithms achieve an error probability performance that is orders of magnitude better than the traditional BLAST detection schemes while maintaining a low computational complexity. Performance is comparable with that of the sphere decoding algorithm, with a much lower complexity. Both the stochastic and deterministic SMC detectors can be employed as the first-stage demodulator in an iterative or turbo receiver in coded MIMO systems.

16 Claims, 10 Drawing Sheets

OTHER PUBLICATIONS

G.J. Foschini, Layered Space-Time Architecture for Wireless Communication in a Fading Environment When Using Multi-Element Antennas, *Bell Labs, Tech. J.*, 1(2):41-59, 1996.

G.D. Golden, G.J. Foschini, R.A. Valenzuela, and P.W. Wolniansky, Detection algorithm and initial laboratory results using V-BLAST space-time communication architecture, *Elect. Let.*, 35:14-16, Jan. 1999.

O. Damen, A. Chkeif, and J. Belfiore, Lattice Code Decoder for Space-Time Codes, *IEEE Commun. Let.*, 4(5):161-163, May 2000.

B.M. Hochwald and S.T. Brink, Archieving Near-Capacity on a Multiple-Antenna Channel, *Submitted to IEEE Trans. Commun.*, Apr. 2002.

A.M. Chan and I. Lee, A New Reduced-Complexity Sphere Decoder For Multiple Antenna Systems, In *Proc. 2002 Int. Commun. Conf. (ICC'02)*, New York, N.Y., Apr. 2002.

A. Doucet, N. deFreitas, and N.J. Gordon (eds.), *Sequential Monte Carlo Methods in Practice*, New York: Springer-Verlag, 620pp., 2001.

X. Wang, R. Chen, and J.S. Liu, Monte Carlo Bayesian Signal Processing for Wireless Communications, *J. VLSI Sig. Proc.*, 30(1-3):89-105, Jan.-Feb.-Mar. 2002.

R. Chen, X.Wang, and J.S. Liu, Adaptive Joint Detection and Decoding in Flat-Fading Channels via Mixture Kalman Filtering, *IEEE Trans. Info. Theory*, 46(6):2079-2094, Sep. 2000.

J.S. Liu and R. Chen, Sequential Monte Carlo Methods for Dynamic Systems, *J. Amer. Stat. Assoc.*, 93:1302-1044, 1998.

R. Chen and J.S. Liu, Mixture Kalman filters, *J. Amer. Stat. Assoc. (B)*, 62:493-509, 2000.

Z. Yang and X. Wang, A Sequential Monte Carlo Blind Receiver for OFDM Systems in Frequency-Selective Fading Channels, *IEEE Trans. Sig. Proc.*, 50(2):271-280, Feb. 2002.

A.M. Tonello, On Turbo Equalization of Interleaved Space-Time Codes, *In Proc. 2001 Fall Vehi. Tech. Conf. (VTC-fall'01)*, Oct. 2001

H. Dai and A.F. Molisch, Multiuser Detection for Interference-Limited MIMO Systems, In *Proc. 2001 Spring Vehi. Tech. Conf. (VTC-spring'01)*, May 2002.

M. Sellathurai and S. Haykin, TURBO-BLAST for Wireless Communications: Theory and Experiments, *IEEE Trans. Sig. Proc.*, 50(10):2538-2546, Oct. 2002.

X. Wang and H.V. Poor, Iterative (Turbo) Soft Interference Cancellation and Decoding for Coded CDMA, *IEEE Trans. Commun.*, 47(7):1046-1061, Jul. 1999.

L.R. Bahl, J. Cocke, F. Jelinek, and J. Raviv, Optimal Decoding of Linear Codes for Minimizing Symbol Error Rate, *IEEE Trans. Info. Theory*, 20(3):284-287, Mar. 1974.

T.L. Marzetta, BLAST Training: Estimating Channel Characteristics for High Capacity Space-Time Wireless, *In Proc. 37th Annual Allerton Conf. Commun., Compu., & Control*, Sep. 1999.

Q. Sun, D.C. Cox, A. Lozano, and H.C. Huang, Training-Based Channel Estimation for Continuous Flat Fading BLAST, *In Proc. 2002 Int. Conf. Commun. (ICC'02)*, New York, N.Y., Apr. 2002.

A. Doucet, S.J. Godsill, and C. Andrieu, On sequential Monte Carlo sampling methods for Bayesian filtering, *Stat. & Comp.*, 10(3):197-208, 2000.

N.J. Gordon, D.J. Salmond, and A.F.M. Smith, Novel approach to nonlinear/non-Gaussian Bayesian state estimation, *In 1993 IEE Proc., F. Radar Sonar and Navigations*, 140(2), Apr. 1993.

G. Kitagawa, Monte Carlo Filter and Smoother for Non-Gaussian Nonlinear State Space Models, *J. Comput. Graph. Statist.*, 5(1):1-25, 1996.

Bin Dong et al., "A New Class of Soft MIMO Demodulation Algorithms", *IEEE Transactions on Signal Processing*, Nov. 2003, vol. 51, No. 11, pp. 2752-2763.

Dong Guo et al., "Blind Detection in MIMO Systems via Sequential Monte Carlo", *IEEE Journal on Seelcted Areas In Communications*, Apr. 2004, vol. 21, No. 3, pp. 464-473.

Xiaodong Wang et al., "Blind Turbo Equalization in Gaussian and Impulsive Noise", *IEEE Transactions on Vehicular Technology*, Jul. 2001, vol. 50, No. 4, pp. 1092-1105.

Search Report dated Jun. 15, 2004 for GB0404318.8.

* cited by examiner

Deterministic SMC turbo receiver, genie - aided

NEAR-OPTIMAL MULTIPLE-INPUT MULTIPLE-OUTPUT (MIMO) CHANNEL DETECTION VIA SEQUENTIAL MONTE CARLO

CROSS-REFERENCE TO RELATED APPLICATIONS

This application claims the benefit of U.S. provisional patent application No. 60/450,777, filed Feb. 28, 2003, incorporated herein by reference.

BACKGROUND OF THE INVENTION

1. Field of Invention

The invention relates generally to digital data receivers.

2. Description of Related Art

The ever-increasing demand for high-speed wireless data transmission has posed great challenges for wireless system designers to achieve high-throughput wireless communications in radio channels with limited bandwidth. Multiple transmit and receive antennas are most likely to be the dominant solution in future broadband wireless communication systems, as the capacity of such a multiple-input multiple-output (MIMO) channel increases linearly with the minimum between the numbers of transmit and receive antennas in a rich-scattering environment, without increasing the bandwidth or transmitted power [1, 2, 3]. See the Appendix for references. Because of the extremely high spectrum efficiency, MIMO techniques have been incorporated into several standards of various wireless applications, such as the IEEE 802.11 a wireless LAN, the IEEE 802.16 wireless MAN, and the WCDMA standards.

The Bell-labs layered space-time (BLAST) architecture is an example of uncoded MIMO systems now under implementation. In the literature [4, 5, 6], different BLAST detection schemes have been proposed based on nulling and interference cancellation (IC), such as the method of zero-forcing (ZF) nulling and IC with ordering, and the method based on minimum mean-squared error (MMSE) nulling and IC with ordering. The performance of these simple detection strategies is significantly inferior to that of the maximum likelihood (ML) detection, whose complexity grows exponential in terms of the number of transmit antennas. In [7, 8, 9], sphere decoding is proposed as a near-optimal BLAST detection method, whose complexity is cubic in terms of the number of transmit antennas. As hard decision algorithms, the above schemes suffer performance losses when concatenated with outer channel decoder in coded MIMO systems. In [8], a list sphere decoding algorithm is proposed to yield soft-decision output by storing a list of symbol sequence candidates. However, the complexity is significantly increased compared with the original sphere decoding algorithm.

The present invention provides a new family of demodulation algorithms based on sequential Monte Carlo methods. The new algorithms may advantageously be used for soft MIMO demodulation and achieve near-optimal performance with low complexities.

The sequential Monte Carlo (SMC) methodology [10, 11, 12, 13, 14, 15] originally emerged in the field of statistics and engineering and has provided a promising new paradigm for the design of low complexity signal processing algorithms with performance approaching the theoretical optimum for fast and reliable communication in highly severe and dynamic wireless environments. The SMC can be loosely defined as a class of methods for solving online estimation problems in dynamic systems, by recursively generating Monte Carlo samples of the state variables or some other latent variables. In [10, 11, 12, 15], SMC has been successfully applied to a number of problems in wireless communications including channel equalization, joint data detection and channel tracking in fading channels, and adaptive OFDM receiver in time dispersive channels.

BRIEF SUMMARY OF THE INVENTION

The present inventor has recognized that an SMC detector may advantageously be used as the soft-input soft-output demodulator in a turbo receiver. In particular, the present invention encompasses a new class of detection schemes that may advantageously be used for soft-input soft-output MIMO detection for quasi-static MIMO fading channels.

This novel class of receivers is based on the SMC framework and can have either stochastic or deterministic settings. The stochastic SMC demodulator employs the techniques of importance sampling and resampling, where the trial sampling distribution is formed by exploiting the artificial sequential structure of the existing simple nulling and cancellation BLAST detection scheme. The deterministic SMC demodulator recursively performs exploration and selection steps to detect the final survivor signal paths with the corresponding importance weights. Being soft-input and soft-output in nature, these SMC detectors can serve as the soft demodulator in a turbo receiver for coded MIMO systems, where the extrinsic information is iteratively exchanged between the soft demodulator and the soft outer channel decoder to successively improve the receiver performance. Moreover, when the channel is unknown and is estimated by using pilot symbols, the decoded code bits with high reliability can act as pilots for channel re-estimation. By performing iterative channel estimation and data detection, the receiver performance can be further improved. The invention can be used in other applications as well, such as in decoding linear dispersion MIMO systems.

In one aspect of the invention, a method for demodulating data from a channel includes receiving a priori probability values for symbols transmitted across the channel, in accordance with the a priori probability values, determining a set of Monte Carlo samples of the symbols weighted with respect to a probability distribution of the symbols, and estimating a posteriori probability values for the symbols based on the set of Monte Carlo samples.

A related program storage device and receiver apparatus are also provided.

BRIEF DESCRIPTION OF THE DRAWINGS

These and other features, benefits and advantages of the present invention will become apparent by reference to the following text and figures, with like reference numbers referring to like structures across the views, wherein.

DETAILED DESCRIPTION OF THE INVENTION

The description is organized as follows. Section 2 describes the system under consideration. Background materials on the SMC methodology are provided in Section 3. In Section 4, we derive the new class of soft MIMO demodulation algorithms using the stochastic SMC and the deterministic SMC, based on the simple nulling and cancellations BLAST detection scheme. Computer simulation results are provided in Section 5, and conclusions are drawn in Section 6.

2 System Descriptions

Figure 1:
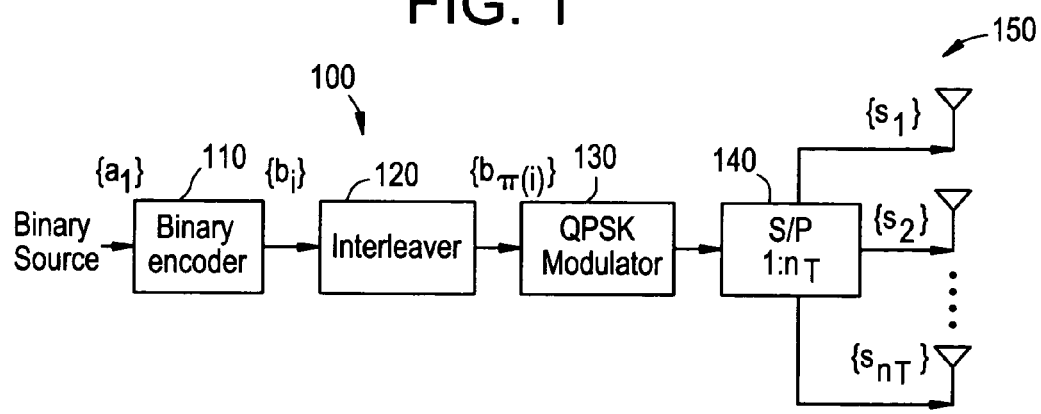
FIG. 1 illustrates a transmitter structure of a coded multiple-input, multiple-output (MIMO) system.
Figure 2:
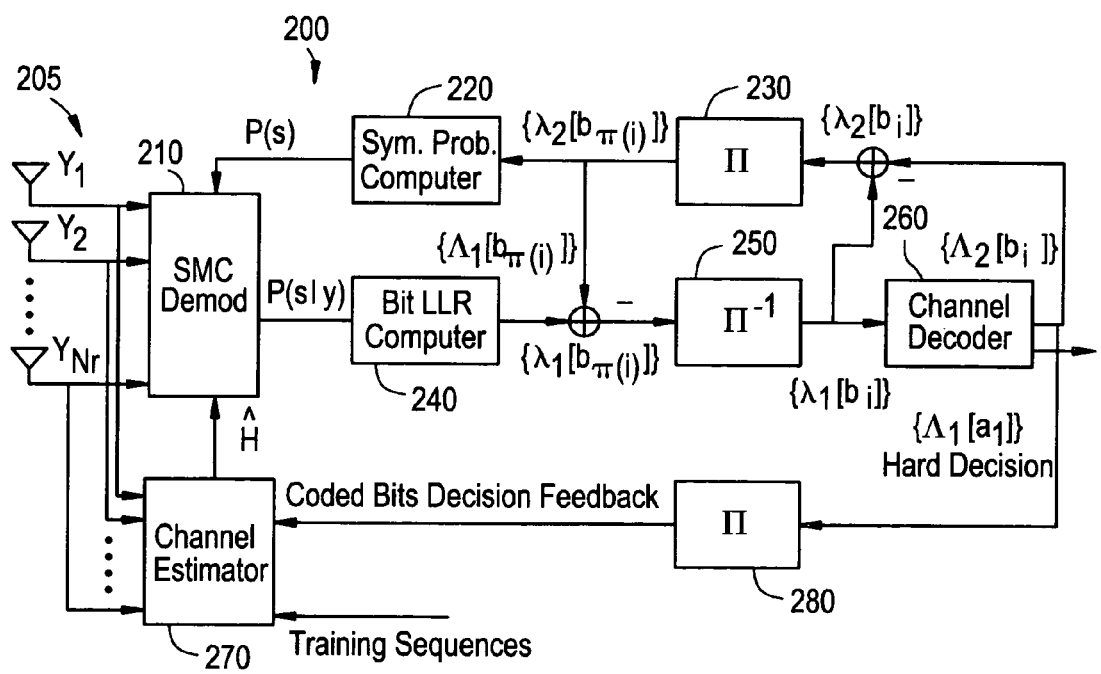
FIG. 2 illustrates a receiver structure of a coded MIMO system.

In this section, we consider a generic coded MIMO system with a turbo receiver. The transmitter and receiver structures are shown in FIG. 1 and FIG. 2, respectively. In FIG. 2, IT denotes the interleaver and $IT^{-1}$ denotes the deinterleaver.

2.1 Transmitter Structure

At the transmitter 100, a block of information bits $\{a_1\}$ are encoded into code bits $\{b_i\}$ at a channel encoder 10. The code bits are then randomly interleaved at an interleaver 120 and mapped to an M-PSK or M-QAM modulation symbol stream using a QPSK modulator 130, taking values from a finite alphabet set $A=\{a_1, a_2, \ldots, a_M\}$. Each symbol is serial-to-parallel (S/P) converted at an S/P converter 140 to $n_T$ sub-streams via demultiplexing, and each sub-stream is associated with one of a number $n_T$ of transmit antennas 150. At each time instance, one symbol from each sub-stream is transmitted from its corresponding antenna, resulting in $n_T$ symbols transmitted simultaneously in the same frequency band. Such a space-time bit interleaved coded modulation (BICM) allows for a better exploitation of the spatial, temporal and frequency diversity resources available in the wireless MIMO systems [16].

We consider a MIMO system with $n_T$ transmit and $n_R$ receive antennas under the BLAST assumption, i.e., assuming that $n_R \geq n_T$ in order to guarantee that the transmitted data symbols can be uniquely decoded at the receiver. The wireless channel is assumed to have rich-scattering and flat fading. The fading between each transmit and receive antenna pair is assumed to be independent. The channel is also assumed quasi-static, i.e., it is static over a data burst and changes from burst to burst.

At the receiver 200, after matched filtering and symbol rate sampling at the receiver's antennas 205, the received signal vector from all $n_R$ receive antennas 205 is denoted as $$y(i)=[y_1(i) \ldots y_{n_R}(i)]^T.$$

In complex baseband representation, the received signal can be expressed as the linear combination of the transmitted signal $s(i)=[s_1(i), \ldots, s_{n_T}(i)]^T$ $$y(i) = \sqrt{\frac{\rho}{n_T}} Hs(i) + v(i), \quad i = 1 \ldots N, \quad (1)$$

where $s(i) \in A^{n_T}$, p is the total signal energy at the transmitter, $H \in C^{n_R \times n_T}$ is the complex fading channel matrix, $v(i) \sim N_c(0, I_{n_R})$ is the spatially and temporally white Gaussian noise, and N is the data burst length.

Denote $\Omega \triangleq H^H H$. The received signal is matched-filtered and whitened, to obtain (here for simplicity, we drop the time index i)

$$u \triangleq \Omega^{-\frac{1}{2}} H^H y = \sqrt{\frac{\rho}{n_T}} \Omega^{\frac{1}{2}} s + w, \quad (2)$$

where $$w \triangleq \Omega^{-\frac{1}{2}} H^H v \sim N_c(0, I_{n_T}).$$

Based on (2), the maximum likelihood (ML) MIMO detector is given by:

$$\hat{s} = \arg \min_{s \in A^{n_T}} \left\| u - \sqrt{\frac{\rho}{n_T}} \Omega^{\frac{1}{2}} s \right\|^2. \quad (3)$$

Subsequently, the complexity of the ML receiver grows exponentially in the number of transmit antennas. Alternative sub-optimal approaches such as the method based on zero-forcing nulling and cancellation with ordering, and the method based on MMSE nulling and cancellation with ordering [1, 6], have lower complexities but also incur substantial performance loss. The sphere decoding method has recently emerged as a near-optimal BLAST detection algorithm. However, its complexity is cubic in term of the number of transmit antennas [7, 8].

2.2 Turbo Receiver

Since the combination of M-PSK or M-QAM modulation and symbol-antenna mapping effectively acts as an inner encoder in the MIMO transmitter, the whole system can be perceived as a serial concatenated system and an iterative (turbo) receiver [17, 18] can be designed for such a system as shown in FIG. 2. The turbo receiver 200 includes two stages: the soft-input soft-output SMC demodulator 210 to be developed in Section 4 followed by a soft channel decoder 260. The two stages are separated by a deinterleaver 250 and an interleaver 230.

The soft MIMO demodulator 210 takes as the input the extrinsic information $\lambda_2[b_i]$ delivered by the channel decoder 260 in the previous turbo iteration as well as the received signals u given by (2). First, the symbol a priori probability is calculated at the symbol probability calculator 220 as follows. Assuming QPSK modulation is employed, the bit pair $\{\beta_{j,1}, \beta_{j,2}\}$ is mapped to symbol $a_j$. Additionally, assume that in the MIMO systems, the transmitted symbol $s_k$ corresponds to the interleaved code bit pair $\{b_{\eta(k,1)}, b_{\eta(k,2)}\}$, for k=1, . . . , $n_T$. The a priori symbol probability for each symbol $a_j \in A$ is then given by $$p_{kj} \triangleq P(s_k = a_j) = P(b_{\eta(k,1)} = \beta_{j,1}) \cdot P(b_{\eta(k,2)} = \beta_{j,2}), \quad (4)$$

where the code bit probability can be computed from the corresponding log likelihood ratio (LLR) as follows [19]:

$$P(b_i = 1) = \frac{\exp(\lambda_2[b_i])}{1 + \exp(\lambda_2[b_i])} \quad (5)$$
$$= \frac{1}{2}\left[1 + \tanh\left(\frac{1}{2}\exp(\lambda_2[b_i])\right)\right].$$

Note that initially the extrinsic information is set to be zero so that the QPSK symbols are equally probable.

At the output of the soft demodulator 210 are the a posteriori symbol probabilities $P(s_k = a_j | u)$, k=1, 2, . . . , $n_T$, j=1, 2, . . . , M. Denote $$S_k^{(j)} \triangleq \{(s_1, \ldots, s_{k-1}, a_j, s_{k+1}, \ldots, s_{n_T}): s_l \in A, l \neq k\}.$$

The exact expression of $P(s_k = a_j | u)$ is given by $$P(s_k = a_j | u) = \frac{p(u | s_k = a_j) P(s_k = a_j)}{p(u)} \quad (6)$$
$$\propto P(s_k = a_j) \sum_{s \in S_k^{(j)}} \exp\left(-\left\|u - \sqrt{\frac{\rho}{n_T}}\Omega^{\frac{1}{2}}s\right\|^2\right)$$
$$\prod_{l \neq k} P(s_l).$$

Since the summations in (6) are over all the $A^{n_T-1}$ possible vector s in $S_k^{(j)}$, j=1, . . . , M, its complexity is exponential in the number of transmit antennas and impractical for systems with high spatial-multiplexing gain. Here, we develop some low complexity algorithms for approximating (6). Based on the symbol a posteriori probabilities computed by the soft demodulator 210, the bit LLR computer 240 calculates the a posteriori log-likelihood ratios (LLRs) of the interleaved code bits $b_{\pi(i)}$. Assuming that the code bit $b_{\pi(i)}$ is included in a QPSK symbol $s_k \in A$, the LLR of this code bit is given by $$\Lambda_1[b_{\pi(i)}] \triangleq \log \frac{P(b_{\pi(i)} = 1 | u)}{P(b_{\pi(i)} = 0 | u)} \quad (7)$$
$$= \log \frac{\sum_{a_j \in A: s_k = a_j, b_{\pi(i)} = 1} P(s_k = a_j | u)}{\sum_{a_j \in A: s_k = a_j, b_{\pi(i)} = 0} P(s_k = a_j | u)},$$

-continued $$k = 1, \ldots, n_T.$$

Using the Bayes' rule, (7) can be written as $$\Lambda_1[b_{\pi(i)}] = \underbrace{\log \frac{P(u | b_{\pi(i)} = 1)}{P(u | b_{\pi(i)} = 0)}}_{\lambda_1[b_{\pi(i)}]} + \underbrace{\log \frac{P(b_{\pi(i)} = 1)}{P(b_{\pi(i)} = 0)}}_{\lambda_2[b_{\pi(i)}]}, \quad (8)$$

where the second term in (8), denoted by $\lambda_2[b_{\pi(i)}]$, represents the a priori LLR of the code bit $b_{\pi(i)}$, which is computed by the channel decoder 260 in the previous iteration, interleaved at the interleaver 230 and then fed back to the soft MIMO demodulator 210. For the first iteration, it is assumed that all code bits are equally likely. The first term in (8), denoted by $\lambda_1[b_{\pi(i)}]$, represents the extrinsic information delivered by the soft MIMO demodulator 210, based on the received signals u, the MIMO signal structure, and the a priori information about all other code bits. The extrinsic information $\lambda_1[b_{\pi(i)}]$ is then deinterleaved at the deinterleaver 250 and fed back to the channel decoder 260, as the a priori information for the channel decoder. The soft decoder 210 takes as input the a priori LLRs of the code bits and delivers as output an update of the LLRs of the coded bits, as well as the LLRs of the information bits based on the code constraints. The soft channel decoding algorithm [20] computes the a posteriori LLR of each code bit, $$\Lambda_2[b_i] \triangleq \log \frac{P(b_i = 1 | \{\lambda_1(b_i)\}_i; \text{ code constraints})}{P(b_i = 0 | \{\lambda_1(b_i)\}_i; \text{ code constraints})} \quad (9)$$
$$= \lambda_2[b_i] + \lambda_1[b_i].$$

where the factorization (9) is shown in [19]. It is seen from (9) that the output of the soft decoder is the sum of the a priori information $\lambda_1[b_i]$, and the extrinsic information $\lambda_2[b_i]$ delivered by the channel decoder 260. This extrinsic information is the information about the code bit $b_i$ gleaned from the a priori information about the other code bits, $\{\lambda_1[b_i]\}_{l \neq i}$, based on the constraint structure of the code. Note that at the first iteration, the extrinsic information $\{\lambda_1[b_i]\}_i$ and $\{\lambda_2[b_i]\}_i$ are statistically independent. But subsequently, since they use the same information indirectly, they will become more and more correlated and finally the improvement through the iterations will diminish.

2.3 MIMO Channel Estimation

Since the receiver 200 has no knowledge of channel state information in realistic MIMO systems, pilot symbols embedded in the data stream are required to estimate the channel impulse response. Assume $T \geq n_T$ time slots are used at the beginning of each data burst to transmit known pilot symbols $S = [s_1, s_2, \ldots, s_T]$. Denote the corresponding received signal as $Y = [y_1, \ldots, y_T]$. Then we have $$Y = \sqrt{\frac{\rho}{n_T}} HS + V, \quad (10)$$

where $V=[v_1, \ldots v_T]$. In [21], two forms of channel estimators at the channel estimator 270 are given, namely, the maximum likelihood (ML) estimator, given by $$\hat{H}_{ML} = \sqrt{\frac{\rho}{n_T}} YS^H(SS^H)^{-1}; \quad (11)$$

and the minimum mean-square error (MMSE) channel estimator given by $$\hat{H}_{MMSE} = \sqrt{\frac{\rho}{n_T}} YS^H\left(\frac{\rho}{n_T}SS^H + I_{n_T}\right)^{-1}. \quad (12)$$

It is also shown in [21, 22] that the optimal training sequence in the sense of minimizing the channel estimation error should satisfy the following orthogonality condition $$SS^H = T \cdot I_{n_T}. \quad (13)$$

One way to produce such a training sequence is to use the complex Walsh codes generated by the Hadamard matrix. As shown in FIG. 2, at the end of each turbo iteration, the a posteriori LLRs of the code bits are fed back from the soft channel decoder 260 through the interleaver 280 to the MIMO channel estimator 270 for channel re-estimation. If the LLRs of all $2n_T$ code bits corresponding to one QPSK MIMO symbol are above a predetermined threshold, the corresponding decoded MIMO symbol is considered as having high-reliability and will act as a training symbol for channel reestimation at the beginning of the next turbo iteration. Intuitively, as the turbo receiver 200 iterates, such a scheme obtains more and more accurate channel estimation since it makes use of more and more training symbols. Accordingly, the overall receiver performance will be improved compared with the scheme where the channel is estimated only once using the pilot symbols before the first turbo iteration.

3 Background on Sequential Monte Carlo

Sequential Monte Carlo (SMC) is a class of efficient methods to obtain random samples from a sequence of probability distributions known only up to a normalizing constant. A general framework for the SMC methods is briefly explained next. Consider the following generic sequence of the a posteriori probability distributions $\{p(X_k|Y_k)\}_{k \geq 0}$ where $X_k = (x_0, x_1, \ldots, x_k)$ is the set of unobserved parameters to be estimated and $Y_k = (y_0, y_1, \ldots, y_k)$ is the set of available observations at index k. We emphasize the fact that k is not necessarily a time index. Typically a posteriori distributions are only known up to a normalizing constant as $p(Y_k) = \int p(Y_k|X_k)p(X_k)dX_k$ is not available in closed form and thus SMC is of great interest in this context. Assume one wants to compute the minimum mean-square error (MMSE) estimate of $h(X_k)$, which is given by $$E\{h(X_k) | Y_k\} = \int h(X_k)p(X_k | Y_k)dX_k. \quad (14)$$

Given m random samples $$\{X_k^{(j)}\}_{j=1}^m$$

distributed according to $p(X_k|Y_k)$, this expectation can be approximated numerically through $$\hat{E}\{h(X_k) | Y_k\} = \frac{1}{m}\sum_{j=1}^m h(X_k^{(j)}). \quad (15)$$

Sampling directly from $p(X_k|Y_k)$ is often not feasible and it is necessary to derive approximate methods.

3.1 Importance Sampling

Sampling directly from p(Xk|Yk) is often not feasible or too computationally expensive, but drawing samples from some trial density "close" to the distribution of interest is often easy. In this case, we can use the idea of importance sampling. Suppose a set of random samples $$\{X_k^{(j)}\}_{j=1}^m$$

distributed according to $q(X_k|Y_k)$ is available. We can still come up with valid estimates of (14) by correcting for the discrepancy between $p(X_k|Y_k)$ and $q(X_k|Y_k)$. By associating the importance weight $$w_k^{(j)} = \frac{p(X_k^{(j)} | Y_k)}{q(X_k^{(j)} | Y_k)}$$

to the sample $X^{(j)}_k$, we can indeed estimate (14) as $$\hat{E}\{h(X_k) | Y_k\} = \frac{1}{W_k}\sum_{j=1}^m w_k^{(j)}h(X_k^{(j)}),$$

with $$W_k = \sum_{j=1}^m w_k^{(j)}.$$

The pair $$\{X_k^{(j)}, w_k^{(j)}\}_{j=1}^m$$

is called a properly weighted sample with respect to the distribution $p(X_k|Y_k)$. It is crucial to notice that one only needs to compute the weights up to a normalizing constant so that the knowledge of $p(Y_k)$ is not necessary. In the "optimal" case where $q(X_k|Y_k) = p(X_k|Y_k)$, then all the weights are equal and have zero variance. Roughly speaking, the performance of the method typically deteriorates when the variance of the weights increases.

The importance sampling method is a generic method that is not sequential. However, one may come up with a sequential version of it. Suppose a set of properly weighted samples $$\{X_{k-1}^{(j)}, w_{k-1}^{(j)}\}_{j=1}^{m}$$

with respect to $p(X_{k-1}|Y_{k-1})$ is available at index k−1. Based on these samples, we want to generate a new set of samples $$\{X_{k}^{(j)}, w_{k}^{(j)}\}_{j=1}^{m}$$

properly weighted with respect to $p(X_k|Y_k)$. The Sequential Importance Sampling (SIS) algorithm proceeds as follows.

Draw a sample $x^{(j)}_k$ from a trial distribution $$q(x_k \mid X_{k-1}^{(j)}, Y_k)$$

and let $$X_k^{(j)} = (X_{k-1}^{(j)}, x_k^{(j)}).$$

Update the importance weight $$w_k^{(j)} = w_{k-1}^{(j)} \cdot \frac{p(X_k^{(j)} \mid Y_k)}{q(X_{k-1}^{(j)} \mid Y_{k-1}) q(x_k^{(j)} \mid X_{k-1}^{(j)}, Y_k)}. \tag{16}$$

One can check that the above algorithm indeed generates properly weighted samples with respect to the distribution $p(X_k|Y_k)$. It is indeed simply an importance sampling method with trial distribution satisfying $$q(X_k|Y_k)=q(X_{k-1}|Y_{k-1})q(\chi_k|X_{k-1},Y_k).$$

This procedure is very general but it is crucial to design a "good" trial distribution to obtain good performance. It is easy to establish that the optimal importance distribution—optimal as it minimizes the conditional variance of the weights var $\{w_k|X_{k-1}, Y_k\}$ [23]—is given by $$q(\chi_k|X_{k-1},Y_k)=p(\chi_k|X_{k-1},Y_k) \tag{17}$$

In this case, the importance weight recursion is $$w_k^{(j)} \propto w_{k-1}^{(j)} \cdot p(y_k \mid X_{k-1}^{(j)}, Y_{k-1}).$$

3.2 Resampling

The importance weight $w^{(j)}_k$ measures the "quality" of the corresponding imputed signal sequence $X^{(j)}_k$. A relatively small weight implies that the sample is drawn far from the main body of the a posteriori distribution and has a small contribution in the final estimation. Such a sample is said to be ineffective. Whatever being the importance distribution used, the SIS algorithm is getting inefficient as k increases. This is because the discrepancy between $q(X_k|Y_k)$ and $p(X_k|Y_k)$ can only increase with k. In practice, after a few steps of the procedure, only one stream dominates all the others; i.e., its importance weight is close to 1 whereas the others are close to 0. To make the SIS procedure efficient in practice, it is necessary to use a resampling procedure as suggested in [24]. Roughly speaking, the aim of resampling is to duplicate the streams with large importance weights while eliminating the streams with small ones; i.e., one focuses the computational efforts in the promising zones of the space. Each sample $X^{(j)}_k$ is copied $\kappa_j$ times with $$\sum_{j=1}^{m} \kappa_j = m.$$

Many resampling procedures have been proposed in the literature [11, 14, 15, 24, 25]. We use here the systematic resampling procedure proposed in [25].

Compute the cumulative distribution $p_0=0, p_j=p_{j-1}+w^{(j)}_k/W_k$ for j=1, . . . , m.

Draw a random number U uniformly in [0, 1]. Compute $U_j=(U+j)/m$ with j=0, . . . ,m−1.

Set $\kappa_j=\{\#i \in \{0, \ldots, m-1\}; p_{j-1} \leq U_i < p_j\}$.

Assign uniform weights $$\hat{w}_k^{(j)} = \frac{1}{m}$$

to the new set of streams $$\{\hat{X}_n^{(j)}\}_{j=1}^{m}.$$

This algorithm is very computationally efficient. In the class of unbiased resampling schemes, i.e., $E\{\kappa_j\}=mw^{(j)}_{k-1}$ this algorithm minimizes the variance var $\{\kappa_j\}$ and displays better performance than other algorithms.

Note that if resampling is used in conjunction with the optimal importance distribution (17), one should perform the resampling step before the sampling step at time k as, in this very specific case, the importance weight at time k is independent of the samples $x^{(j)}k$.

Resampling can be done at every fixed-length time interval (say, every five time steps or otherwise periodically) or it can be conducted dynamically. The effective sample size is a criterion that can be used to monitor the variation of the importance weights of the sample streams, and to decide when to resample as the system evolves. The effective sample size is defined as $$\overline{m}_k \triangleq \frac{m}{1 + v_k^2},$$

where $v_k$, the coefficient of variation, is given by $$v_k^2 = \frac{1}{m}\sum_{j=1}^{m}\left(\frac{w_k^{(j)}}{\overline{w}_k}-1\right)^2,$$

with $$\overline{w}_k = \frac{1}{m}\sum_{j=1}^{m} w_k^{(j)}.$$

Roughly speaking, the effective sample size is a measure of variation over the weights. In the optimal case, where all the weights are equal, then it is maximum and equal to m. When one weight dominates all the others, then it is very small. In dynamic resampling, a resampling step is performed once the effective sample size $\overline{m}_k$, is below a certain threshold. An alternative criterion such as the entropy of the weights could also be used.

Heuristically, resampling can provide chances for good sample streams to amplify themselves and hence "rejuvenate" the samples to produce better results in the next steps. It can be shown that if m is sufficiently large the resampled streams drawn by the above resampling scheme are also properly weighted with respect to $p(X_k|Y_k)$. In practice, when small to modest m is used (We use m=64 here), the resampling procedure can be seen as a trade-off between the bias and the variance. That is, the new samples with their weights resulting from the resampling procedure are only approximately proper, which introduces small bias in the Monte Carlo estimates. On the other hand, resampling significantly reduces the Monte Carlo variance for the future samples.

3.3 An Alternative Deterministic Procedure

SMC is a very general set of methods to sample probability distributions on any space one wants. We restrict ourselves to a case of great interest in telecommunications; namely the case where $x_k$ can only take values in a finite set say X. In this case the a posteriori distribution $p(X_k|Y_k)$ could be computed exactly but it is typically far too computationally expensive when k is large as $X_k$ can take $|X|^k$ possible values where $|X|$ is the number of elements in X.

In this very specific case, the SIS procedure with the optimal importance distribution (17) takes the following form.

Draw a sample $x^{(j)}_k$ from $p(x_k|X^{(j)}_{k-1}, Y_k)$ and let $X^{(j)}_k = (X^{(j)}_{k-1}, x^{(j)}_k)$.

Update the importance weight $$w_k^{(j)} \propto w_{k-1}^{(j)} \cdot p(y_k \mid X_{k-1}^{(j)}, Y_{k-1}).$$

The importance weight is computed using $$p(y_k \mid X_{k-1}, Y_{k-1}) = \sum_{x_k \in \chi} p(y_k \mid X_k, Y_{k-1})p(x_k \mid X_{k-1}). \quad (18)$$

Two points can be criticized about this algorithm. First, assume that the number of streams m is equal to $|X|^l$ with $1<n$.

(If $l \geq k$ then one could compute $p(X_k|Y_k)$ exactly). The algorithm should enumerate the first MI possibilities and compute their a posteriori probabilities; i.e., one should compute $p(X_k|Y_k)$ exactly. This can be easily incorporated in the initialization phase of an SMC algorithm. Second, one can see that the calculation of the weights (18) involves computing the a posteriori distribution up to a normalizing constant of m|X| streams. Indeed for each $X^{(j)}_{k-1}$, one needs to compute $p(y_k|X^{(j)}_{k-1}, x_k, Y_{k-1})$ for $X_k \in X$. By sampling $X^{(j)}_k$ this information is somehow discarded. An alternative deterministic approach consists of keeping among the m|X| "candidate" trajectories at time $$\{X_{k-1}^{(j)}, x_k \in \chi\}_{j=1}^{m},$$

the m trajectories with the highest a posteriori distribution. This algorithm can be interpreted as an extended Viterbi algorithm with m survivors. Clearly the local approximation error one commits at the selection step using this deterministic strategy is lower than using the randomized strategy. Nevertheless it does not guarantee performance to be better overall.

To sum up, given $$\{X_{k-1}^{(j)}\}_{j=1}^{m}$$

with a posteriori distributions (known up to a normalizing constant)

$$\{w_{k-1}^{(j)}\}_{j=1}^{m},$$

the algorithm proceeds as follows at time k.

Compute $$w_k^{(j)}(\chi_k) \propto w_{k-1}^{(j)} \cdot p(Y_k|X_{k-1}^{(j)}, \chi_k, Y_{k-1}), \chi_k \in X.$$

Select and preserve only the m "best" distinct streams amongst the mm hypotheses.

The drawback of this approach is that clearly the past observations are as important as the current observation in the calculation of the weight. If an error is committed then it has a significant impact on further decisions. The randomized algorithm is less sensitive to this problem as when the streams are resampled their weights are set to 1/m.

It is worth noticing that both the stochastic and deterministic algorithms are well suited for parallel implementation.

4 Soft MIMO Demodulation Algorithms

In this section, we will derive soft-input soft-output MIMO demodulation algorithms based on the sequential Monte Carlo principle. The importance sampling density is obtained by utilizing the artificial sequential structure of the existing simple nulling and cancellation BLAST detection scheme. First, the channel parameters are assumed to have been estimated perfectly at the receiver through the short training sequence before detection. Later, we will examine the effect of channel estimation error on systems performance with pilot symbols along with high-quality symbol decision feedback.

4.1 Simple Nulling and Cancellation BLAST Detection Algorithm

Consider the signal model (2), we denote the QR-decomposition of $\Omega^{1/2}$ as $$\Omega^{1/2}=QR, \quad (20)$$

where Q is a unitary matrix and R is an upper triangular matrix. The nulling operation is a coordinate rotation that left-multiplies the vector u on (2) by $Q^H$ to produce a sufficient statistic, $$z = Q^H u = \sqrt{\frac{\rho}{n_T}} Rs + \tilde{v}, \quad (21)$$

where $\tilde{v}=Q^H v$. Since Q is unitary, there is no noise enhancement and the noise whitening characteristic maintains by nulling, i.e., $\tilde{v} \sim N_c(0, 1_{n_T})$. We rewrite (21) as $$\underbrace{\begin{bmatrix} z_1 \\ z_2 \\ \vdots \\ z_{n_T} \end{bmatrix}}_{z} = \sqrt{\frac{\rho}{n_T}} \underbrace{\begin{bmatrix} r_{1,1} & r_{1,2} & \cdots & r_{1,n_T} \\ & r_{2,2} & \cdots & r_{2,n_T} \\ & & \ddots & \vdots \\ & & & r_{n_T,n_T} \end{bmatrix}}_{R} \underbrace{\begin{bmatrix} s_1 \\ s_2 \\ \vdots \\ s_{n_T} \end{bmatrix}}_{s} + \underbrace{\begin{bmatrix} \tilde{v}_1 \\ \tilde{v}_2 \\ \vdots \\ \tilde{v}_{n_T} \end{bmatrix}}_{\tilde{v}} \quad (22)$$

We can detect data symbols directly by nulling operation, i.e., multiply z by $R^{-1}$. However in [5], it is shown that by utilizing the upper triangular structure of R, significant improvement over zero-forcing can be obtained with the following successive interference cancellation method:

$$\hat{s}_{n_T} = L\left(\sqrt{\frac{n_T}{\rho}} \frac{z_{n_T}}{r_{n_T,n_T}}\right), \quad (23)$$

$$\hat{s}_{n_T-1} = L\left(\frac{1}{r_{n_T-1,n_T-1}} \left(\sqrt{\frac{n_T}{\rho}} z_{n_T-1} - r_{n_T-1,n_T} \hat{s}_{n_T}\right)\right),$$

$$\vdots$$

$$\hat{s}_1 = L\left(\frac{1}{r_{1,1}} \left(\sqrt{\frac{n_T}{\rho}} z_1 - \sum_{k=2}^{n_T} r_{1,k} \hat{s}_k\right)\right),$$

where $L(x)=\arg\min_{S_i \in A}(|x-s_i|)$. Although the above simple nulling and cancellation scheme has a very low complexity, its performance is much worse than that of the methods based on zero forcing or MMSE nulling and interference cancellation with ordering as well as that of the sphere decoding algorithm (See FIG. 5). In what follows, we develop SMC-based MIMO demodulation algorithms using the above simple nulling and cancellation method as the kernel. As will be seen in Section 5, these new algorithms provide near-optimal performance in both uncoded and coded MIMO systems.

4.2 Stochastic SMC MIMO Demodulator

As from (22), the artificial sequential structure of the simple nulling and interference cancellation scheme due to the upper-triangular structure is well suited for applying the SMC method to MIMO data detection with the particularity of operating on spatial domain starting from antenna $n_T$ to antenna 1. Indeed one has $$P(s|u) = P(s|z) \propto \prod_{k=1}^{n_T} p(z_k | \tilde{S}_k) P(s_k), \quad (24)$$

where $\tilde{Z}_k=(z_k, \ldots, z_{n_T})$ and $\tilde{S}_k=(s_k, \ldots, s_{n_T})$. We can thus use SMC methods to simulate from the sequence of probability distributions $$\{p(\tilde{S}_k | \tilde{Z}_k)\}_{k=n_T, n_T-1, \ldots, 1}.$$

This sequence of "artificial" distributions is defined by $$P(\tilde{S}_k | \tilde{Z}_k) \propto \prod_{l=k}^{n_T} p(z_l | \tilde{S}_l) P(s_l). \quad (25)$$

The aim of SMC MIMO detection is to compute an estimate of the a posteriori symbol probability $$P(s_k=a_i|z), a_i \in A, k=1, \ldots, n_T, \quad (26)$$

based on the received signal z after nulling. Let $$\tilde{S}_k^{(j)} \triangleq (s_k^{(j)}, \ldots, s_{n_T}^{(j)}), j = 1, \ldots, m,$$

be a sample drawn by the SMC at each symbol interval, where m is the number of samples. In order to implement the SMC, we need to obtain a set of Monte Carlo samples of the transmitted symbols $\{s^{(j)}_k, w^{(j)}_k\}$ properly weighted with respect to the distribution of p(s|z). In the application of MIMO demodulation, the function h(·) in (15) is specified by the indicator function 1(·) as $$1(x=a) = \begin{cases} 1, & \text{if } x = a, \\ 0, & \text{if } x \neq a. \end{cases} \quad (27)$$

Hence, the a posteriori probability of the information symbol $s_k$ can then be estimated as $$P(s_k = a_i | z) = E\{1(s_k = a_i) | z\} \quad (28)$$

$$\cong \frac{1}{W_k} \sum_{j=1}^{m} 1(s_k^{(j)} = a_i) w_k^{(j)}, a_i \in A,$$

where $$W_k \triangleq \sum_{j=1}^{m} w_k^{(j)}.$$

Following (17) in Section 3.1, we choose the trial distribution as:

$$q(s_k | \tilde{Z}_k, \tilde{S}_{k+1}^{(j)}) \propto P(s_k | \tilde{Z}_k, \tilde{S}_{k+1}^{(j)}). \quad (29)$$

For this trial distribution, the importance weight is updated according to $$w_k^{(j)} = w_{k+1}^{(j)} \cdot \frac{P(\tilde{S}_k^{(j)} | \tilde{Z}_k)}{P(\tilde{S}_{k+1}^{(j)} | \tilde{Z}_{k+1}) P(\tilde{S}_k^{(j)} | \tilde{Z}_k, \tilde{S}_{k+1}^{(j)})} \quad (30)$$

$$= w_{k+1}^{(j)} \cdot \frac{P(\tilde{S}_{k+1}^{(j)} | \tilde{Z}_k)}{P(\tilde{S}_{k+1}^{(j)} | \tilde{Z}_{k+1})}$$

$$\propto w_{k+1}^{(j)} \cdot p(z_k | \tilde{Z}_{k+1}, \tilde{S}_{k+1}^{(j)}).$$

We next specify the computation of the predictive distribution in (29) and (30). First, we consider the trial distributions in (29)

$$q(s_k | \tilde{Z}_k, \tilde{S}_{k+1}^{(j)}) \propto p(z_k | s_k, \tilde{Z}_{k+1}, \tilde{S}_{k+1}^{(j)}) \cdot P(s_k) \quad (31)$$

Since the noise $\bar{v}$ in (21) is white Gaussian i.e., $\bar{v} \sim N_c(0, 1_{n_T})$, we have $$p(z_k | \tilde{Z}_{k+1}, \tilde{S}_{k+1}^{(j)}, s_k = a_i) \sim N_c(\mu_{k,i}^{(j)}, 1), \quad (32)$$

where the mean $\mu_{k,i}^{(j)}$ is given by $$\mu_{k,i}^{(j)} = \left( \sqrt{\frac{\rho}{n_T}} \sum_{l=k+1}^{n_T} r_{k,l} b_l^{(j)} + \sqrt{\frac{\rho}{n_T}} r_{k,k} a_i \right). \quad (33)$$

We denote $$\alpha_{k,i}^{(j)} \triangleq p(z_k | \tilde{Z}_{k+1}, \tilde{S}_{k+1}^{(j)}, s_k = a_i) \cdot P(s_k = a_i) \quad (34)$$

$$= \frac{1}{\pi} \exp\{-\|z_k - \mu_{k,i}^{(j)}\|^2\} \cdot P(s_k = a_i). \quad (35)$$

Hence, the predictive distribution in (30) is given by $$p(z_k | \tilde{Z}_{k+1}, \tilde{S}_{k+1}^{(j)}) \propto \sum_{a_i \in A} p(z_k | \tilde{Z}_{k+1}, \tilde{S}_{k+1}^{(j)}, s_k = a_i) P(s_k = a_i) \quad (36)$$

$$= \sum_{a_i \in A} \alpha_{k,i}^{(j)}$$

Figure 3:
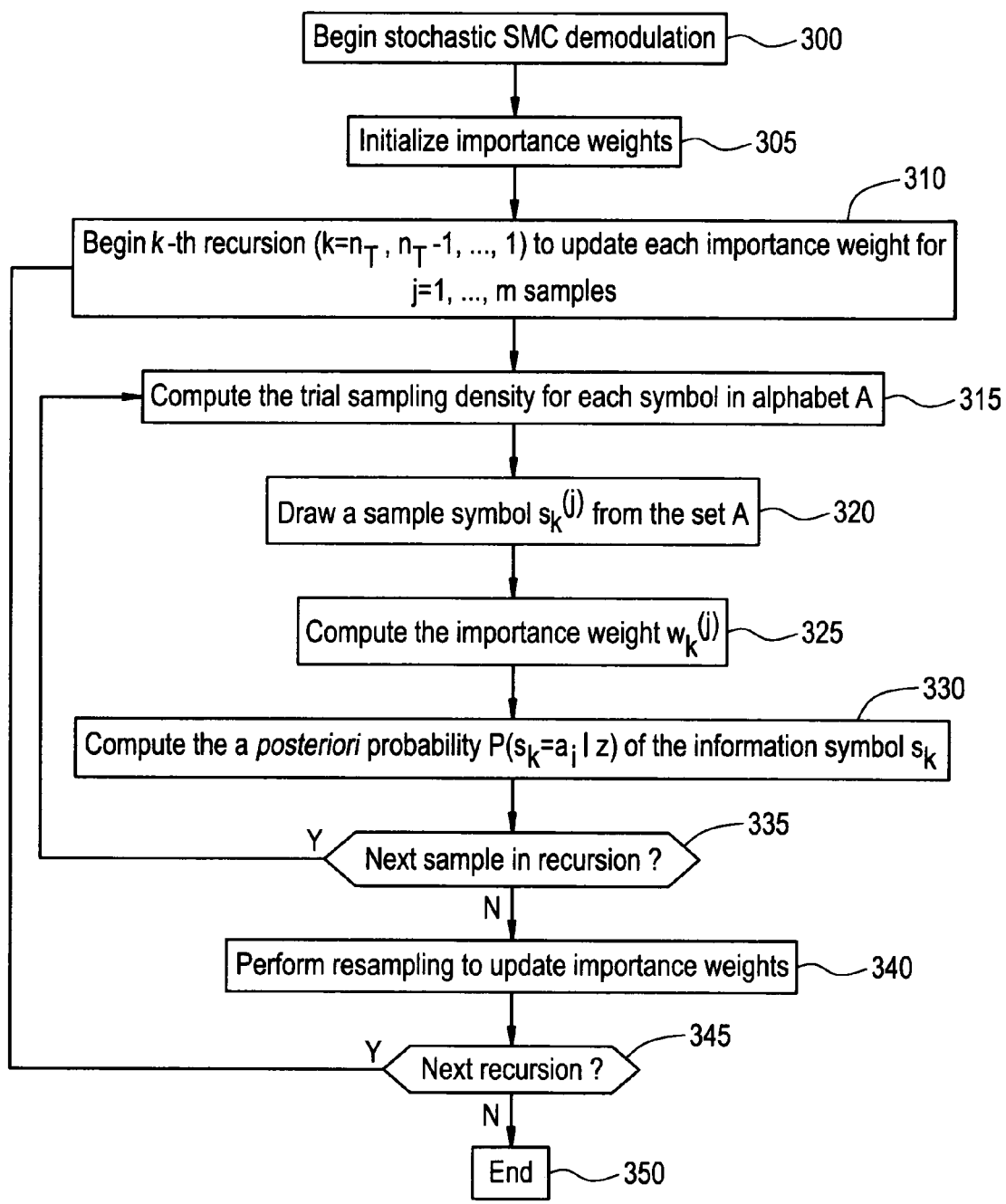
FIG. 3 illustrates a stochastic SMC MIMO demodulation process.

Referring to FIG. 3, we summarize the stochastic SMC MIMO demodulation process, which begins at block 300, as follows:

0. Initialization: all importance weights are initialized as $w_{-1}^{(j)} = 1, j=1, \ldots, m$ (block 305).

At block 310, the following steps are implemented at the k-th recursion ($k=n_T, n_T-1, \ldots, 1$) to update each weighted sample. For $j=1, \ldots, m$:

1. At block 315, compute the trial sampling density $\alpha_{k,i}^{(j)}$ for each $a_i \in A$ according to (35) with the a priori symbol probability $P(s_k = a_i)$ obtained from the last turbo iteration, calculated using (4).

2. At block 320, draw a sample $s_k^{(j)}$ from the set A with probability $$P(s_k = a_i | \tilde{S}_{k+1}^{(j)}, \tilde{Z}_k) \propto \alpha_{k,i}^{(j)}, a_i \in A. \quad (37)$$

3. At block 325, compute the importance weight $$w_k^{(j)} \propto w_{k+1}^{(j)} \cdot \sum_{a_i \in A} \alpha_{k,i}^{(j)}, \quad (38)$$

4. At block 330, compute the a posteriori probability of the information symbol $s_k$ according to (28).

5. At block 335, the process is repeated for the next sample in the recursion until the last (j=m) sample is reached. At block 340, resampling may be performed as described in Section 3.2. Note that the resampling does not necessarily occur in the sequence indicated in FIG. 3. At block 345, the process is repeated for the next recursion until the last recursion (k=1) is reached. At block 350, the process ends.

The stochastic and deterministic demodulation processes of the invention may be implemented using any known hardware, firmware and/or software. For example, the demodulator 210 may include an ASIC that is programmed to perform the desired calculations. A program storage device such as a memory may tangibly embody a program of instructions that are executable by a machine such as a microprocessor to perform the demodulation. The program storage device and microprocessor may be part of, or otherwise associated with, the demodulator 210 and possibly other components in the receiver 200. Moreover, the functionality of any of the components in the receiver 200 may be implemented similarly.

4.3 Deterministic SMC MIMO Demodulator

The deterministic method for estimating the sequence of probability distributions $$\{P(\tilde{S}_k | \tilde{Z}_k)\}_{k=n_T, n_T-1, \ldots, 1}$$

proceeds as follows. Similarly to the stochastic case, we assume that m samples are drawn at each iteration where $m=|A|^l$ with $l<n_T$. Note that if $l=n_T$, it is equivalent to the maximum likelihood detection and involves $|A|^{n_T}$ calculations. In the exploration step, we compute exactly the distribution $$P(\tilde{S}_{n_T-l+1} | \tilde{Z}_{n_T-l+1})$$

by enumerating all m particles, e.g., samples, for antenna $n_T$ down to antenna $n_T-l+1$. As a result, we have a set of m distinct QPSK sequences $$\{\tilde{S}_{n_T-l+1}^{(j)}\}_{j=1}^m$$

with weights $$\{w_{n_T-l+1}^{(j)}\}_{j=1}^m$$

satisfying $$w_{n_T-l+1}^{(j)} = P(\tilde{S}_{n_T-l+1}^{(j)} \mid \tilde{Z}_{n_T-l+1}) \quad (39)$$

$$\propto \prod_{k=n_T-l+1}^{n_T} p(z_k \mid \tilde{S}_{k+1}^{(j)}, s_k^{(j)} = a_i) \cdot P(s_k^{(j)} = a_i)$$

$$= \prod_{k=n_T-l+1}^{n_T} \beta_{k,i}^{(j)},$$

where $$\beta_{k,i}^{(j)} \triangleq p(z_k \mid \tilde{S}_{k+1}^{(j)}, s_k^{(j)} = a_i) \cdot P(s_k^{(j)} = a_i) \quad (40)$$

$$= \frac{1}{\pi} \exp\{-\|z_k - \mu_{k,i}^{(j)}\|^2\} \cdot P(s_k^{(j)} = a_i), \quad (41)$$

and $\mu_{k,i}^{(j)}$ is given by (33).

Figure 4:
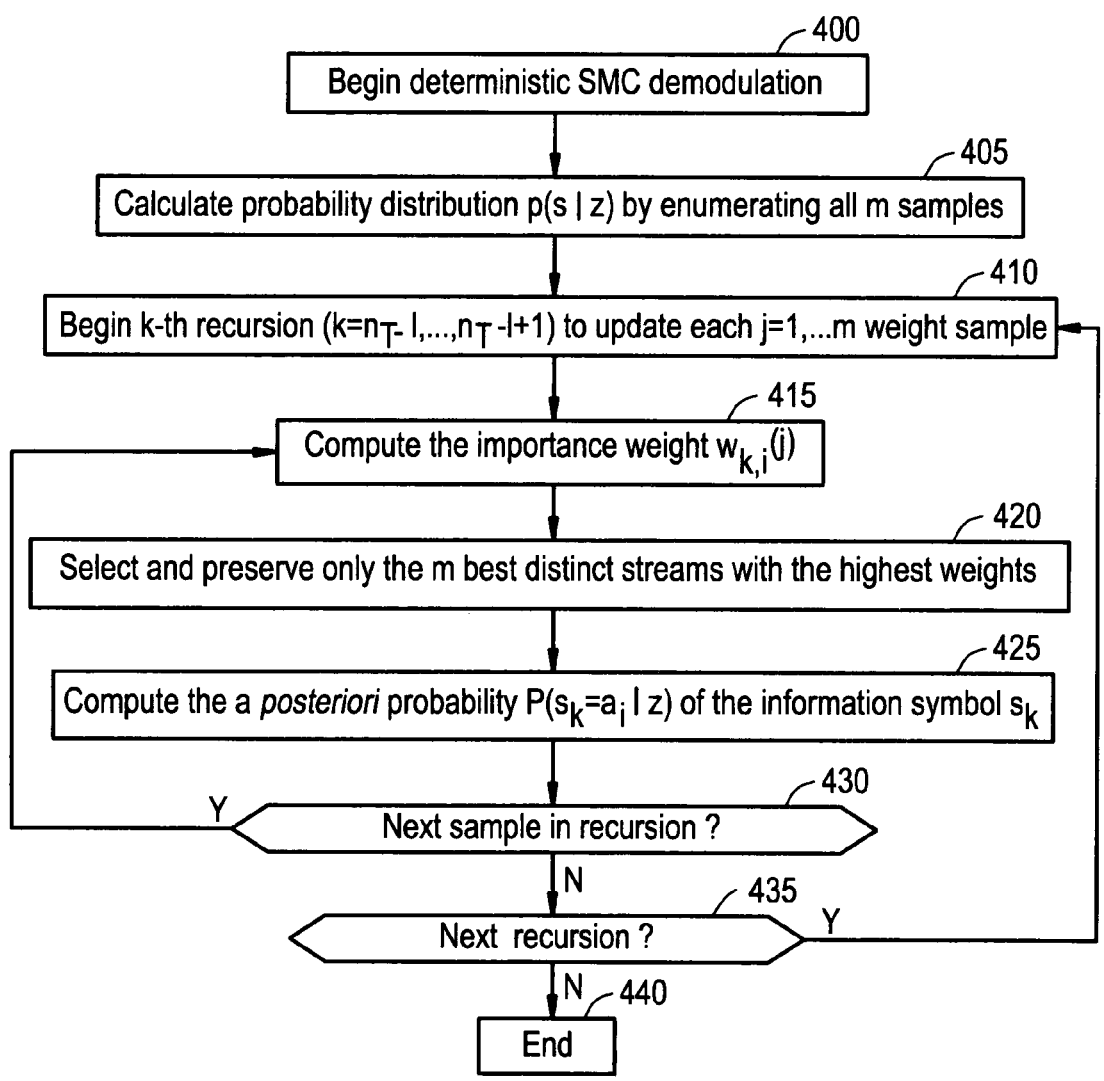
FIG. 4 illustrates a deterministic SMC MIMO demodulation process.

The second step is the extended Viterbi algorithm as described in Section 3.3 performed from antenna $n_T-l$ to antenna 1 (i.e., $k=n_T-l, \ldots, 1$). We need to update the importance weight according to $$w_k^{(j)}(a_i) \propto w_{k+1}^{(j)} \cdot p(z_k \mid \tilde{S}_{k+1}^{(j)}; s_k^{(j)} = a_i) P(s_k^{(j)} = a_i), a_i \in A, \quad (42)$$

where the m distinct QPSK symbol sequences with highest importance weights are selected as the survivor paths over m|A| hypotheses. The deterministic SMC MIMO demodulation algorithm, which begins at block 400, is summarized in FIG. 4 as follows:

0. Initialization: for $k=n_T, \ldots, n_T-l+1$, calculate the exact expression of the probability distribution via (41) by enumerating all m particles (samples) (block 405).

At block 410, the following steps are implemented at the kth recursion ($k=n_T-l, n_T-l-1, \ldots, 1$) to update each weight sample. For $j=1, \ldots, m$:

1. At block 415, compute the importance weight $$w_{k,i}^{(j)} \propto w_{k-1}^{(j)} \cdot \beta_{k,i}^{(j)}, \quad (43)$$

where $\beta_{k,i}^{(j)}$ is given by (41).

2. At block 420, select and preserve only the m "best" distinct streams $\tilde{S}_k^{(j)}$ with the highest weights amongst the m|A| hypotheses with weights set $\{w_{k,i}^{(j)}\}$.

3. At block 425, compute the a posteriori probability of the information symbol $S_k$ according to (28). At block 430, the process is repeated for the next sample in the recursion until the last (j=m) sample is reached. At block 435, the process is repeated for the next recursion until the last recursion ($k=n_T-l+1$) is reached. At block 440, the process ends.

5 Simulation Results

In this section, we provide computer simulation results to illustrate the performance of the proposed turbo receivers in flat-fading MIMO channels with $n_T=n_R=8$. The fading coefficients are generated according to $h_{4j} \stackrel{iid}{\sim} N_c(0, 1)$, where i.i.d. denotes "independent, identically distributed". Channels are assumed to be quasi-static, i.e., they remain constant over the entire frame of N symbols, but vary from frame to frame. Simulation results are obtained by averaging over 500 channel realizations. The number of samples drawn in the stochastic SMC algorithm is m=64. The number of samples drawn in the deterministic algorithm is m=64 (i.e., l=3) in the uncoded case and m=16 (i.e., l=2) in the coded case.

5.1 Performance in Uncoded MIMO Systems

Figure 5:
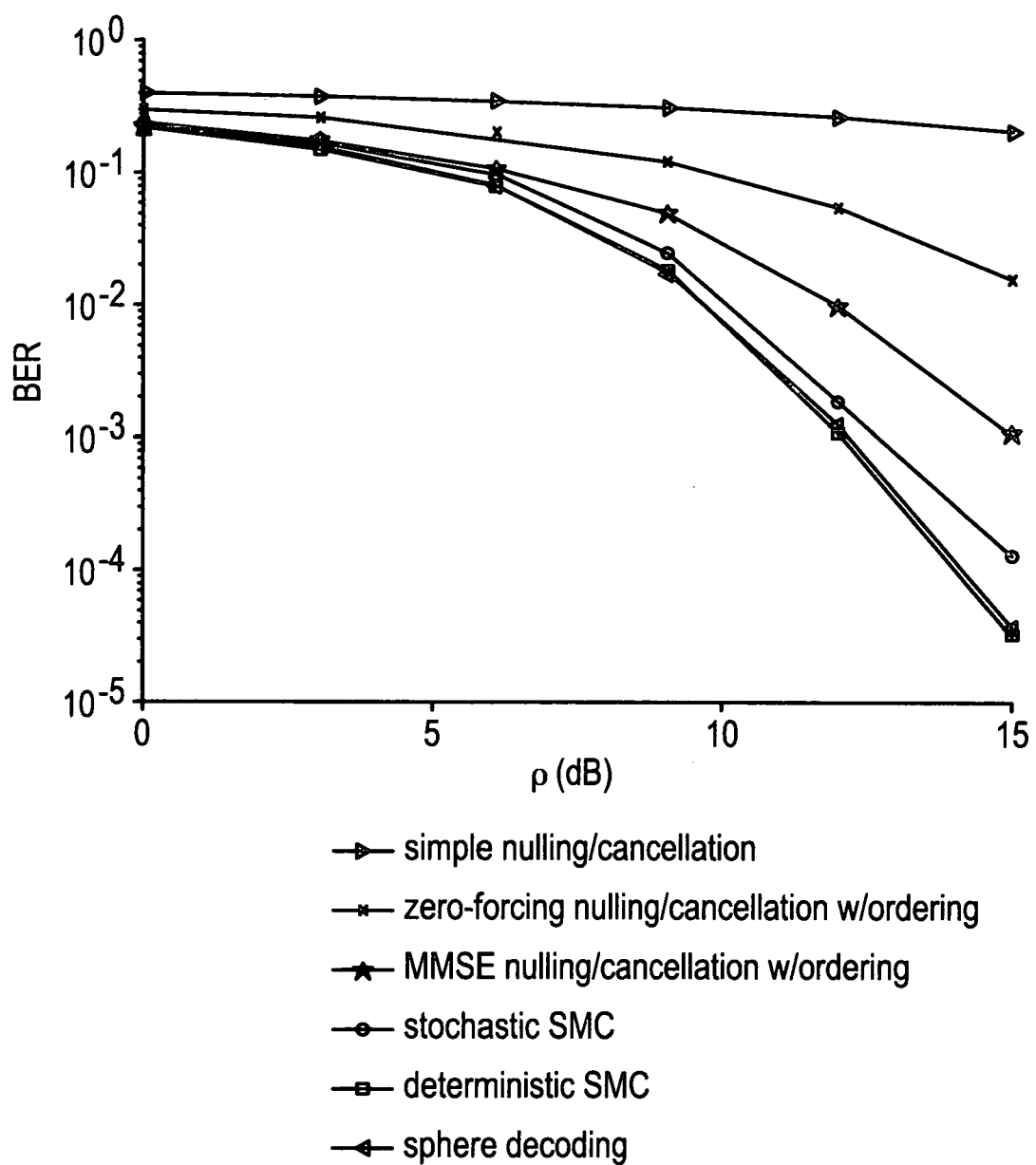
FIG. 5 illustrates bit error rate (BER) performance of various MIMO demodulation algorithms in an uncoded MIMO system.

We first illustrate the performance of the proposed stochastic and deterministic SMC MIMO demodulation algorithms in an uncoded MIMO system. The BER performance of these two new algorithms, together with some existing detection algorithms (including the sphere decoding algorithm, the method based on MMSE nulling and cancellation with ordering, the method based on zero-forcing nulling and cancellation with ordering, as well as the simple nulling and cancellation method) are shown in FIG. 5. QPSK modulation is used. Several observations are in order. First of all, the simple nulling and cancellation method displays very poor performance. However, when it is combined with SMC (deterministic or stochastic), we obtain a much more powerful MIMO detector. Secondly, the deterministic detector outperforms the stochastic SMC detector and it actually slightly outperforms the sphere decoding algorithms, which is the best suboptimal MIMO detector known so far!

5.2 Performance in Coded MIMO Systems

For the coded MIMO system, a rate-1/2 constraint length-5 convolutional code (with generators 23 and 35 in octal notation) is employed at the transmitter. The bit interleaver is randomly generated and fixed throughout the simulations. The code bit block size is 512, corresponding to 256 information bits and 32 QPSK MIMO symbols. The channel estimator employed here is the MMSE MIMO channel estimator given by (12), where $T=n_T=8$, and QPSK orthogonal MIMO pilot symbols are used. The number of turbo iterations in each simulation run is four.

Figure 6:
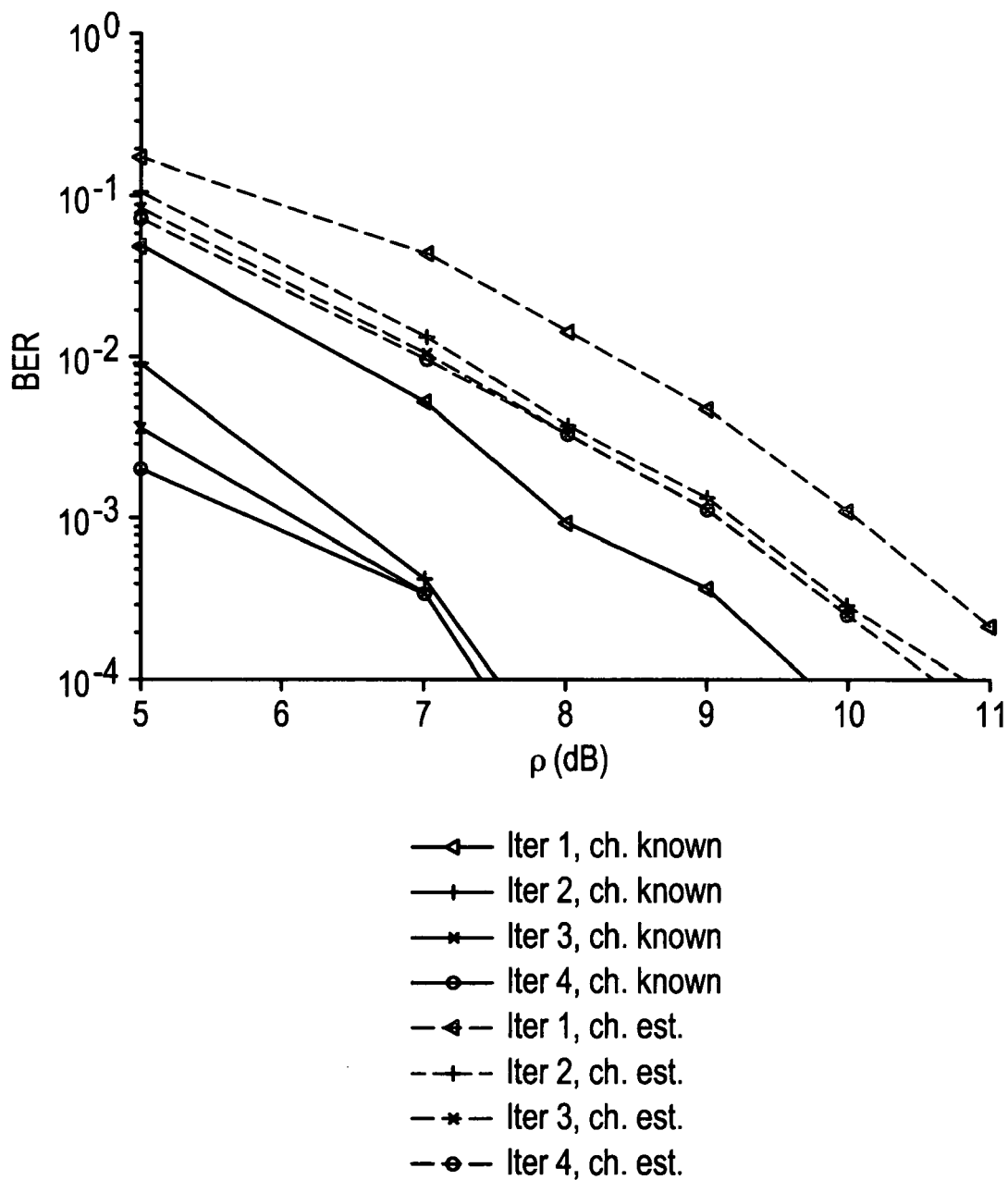
FIG. 6 illustrates BER performance of a turbo MIMO receiver employing the stochastic sequential Monte Carlo (SMC) MIMO demodulator, where channel estimation is based on pilots only.
Figure 7:
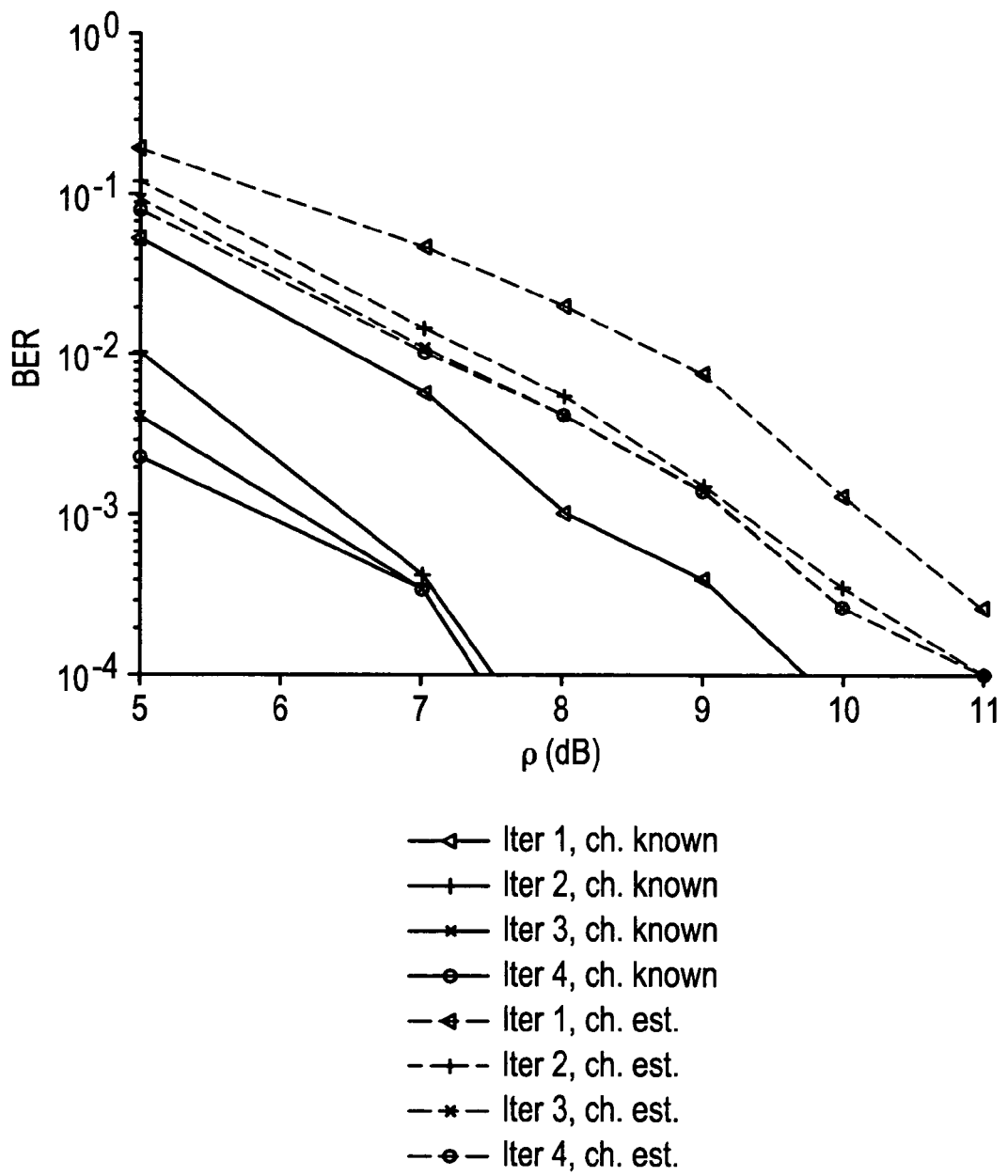
FIG. 7 illustrates BER performance of a turbo MIMO receiver employing the stochastic SMC MIMO demodulator, where iterative channel estimation is based on pilots and the decoded symbols with high reliability.
Figure 8:
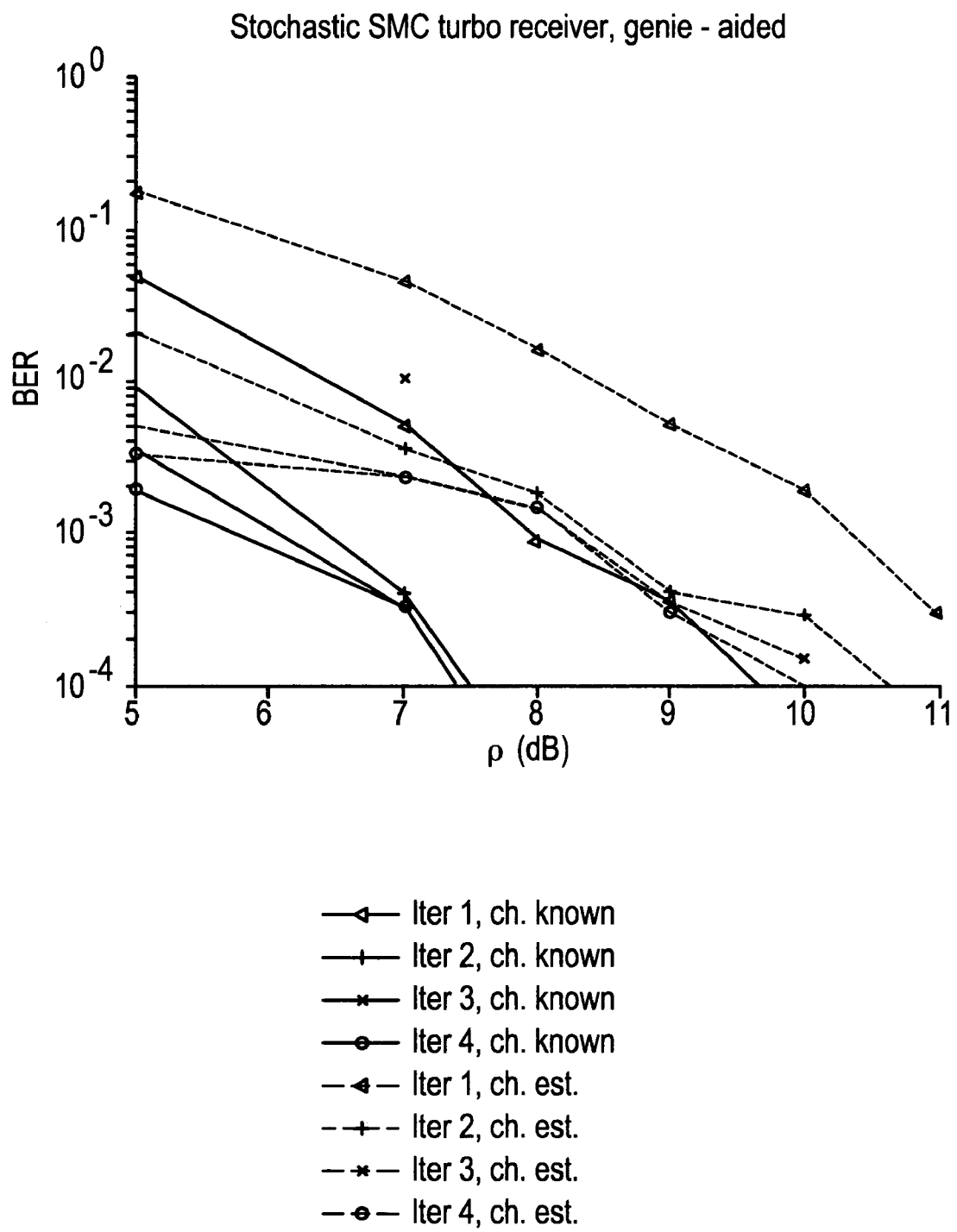
FIG. 8 illustrates BER performance of a turbo MIMO receiver employing the stochastic SMC MIMO demodulator, where genie-aided channel estimation is based on pilots and all information symbols.

In FIGS. 6, 7 and 8, the BER performance of the turbo receiver employing the stochastic SMC demodulator is plotted. "Iter" denotes "iteration", "ch" denotes "channel" and "est." denotes "estimated". The solid curves in these figures correspond to the BER performance with perfectly known channel; whereas the dashed curves correspond to the BER performance with different channel estimation schemes. In FIG. 6, the channel is estimated only once based on the pilots and used throughout all turbo iterations. In FIG. 7, the channel is re-estimated at the beginning of each turbo iteration using both the pilots and the decoded symbols with high-reliability, as discussed in Section 2.3. And in FIG. 8, we assume the channel is estimated by a genie that knows both the pilot symbols and all information symbols. Such a genie aid channel estimate is used throughout all turbo iterations. The scenario for FIG. 8 provides an upper bound on the achievable performance for the turbo receivers with different channel estimation schemes. It is seen that by performing iterative channel estimation and symbol detection, the turbo receiver offers a performance approaching the genie-aided bound.

Figure 9:
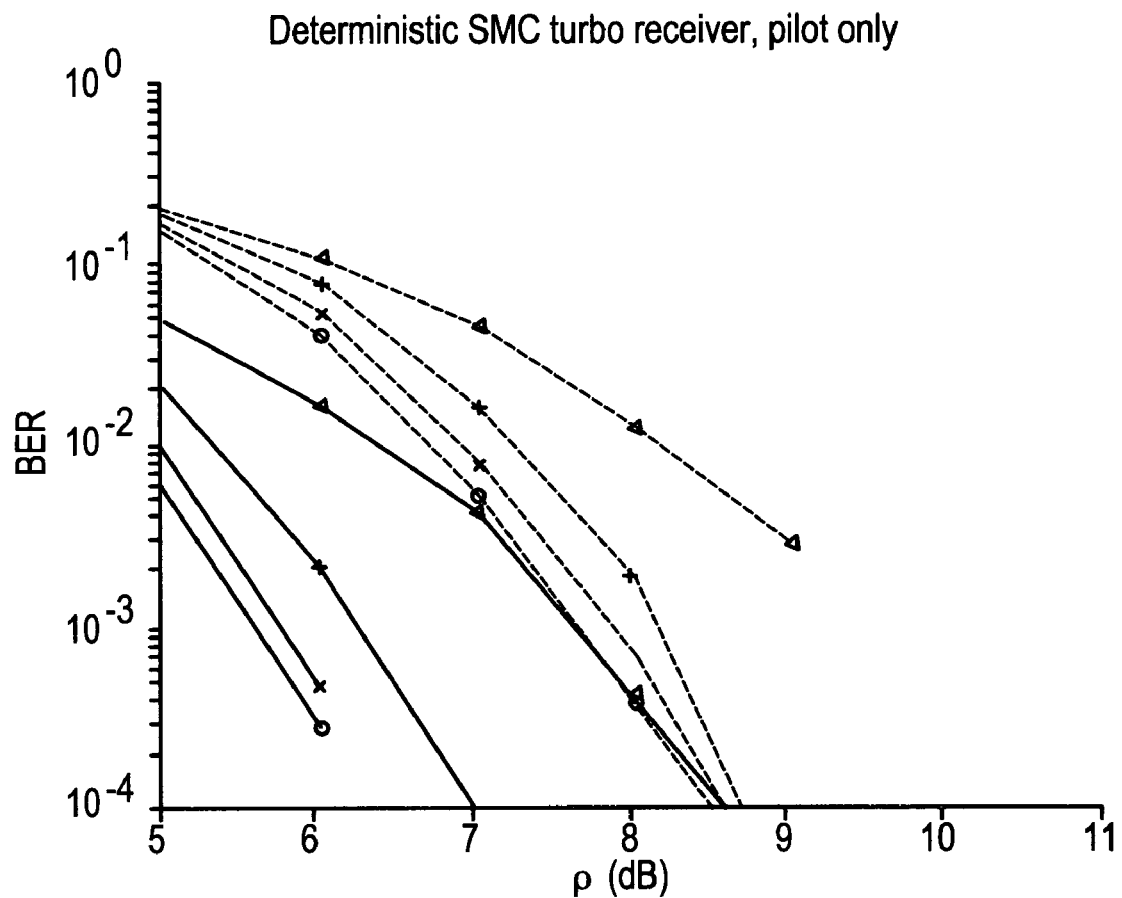
FIG. 9 illustrates BER performance of a turbo MIMO receiver employing the deterministic SMC MIMO demodulator, where channel estimation is based on pilots only.
Figure 10:
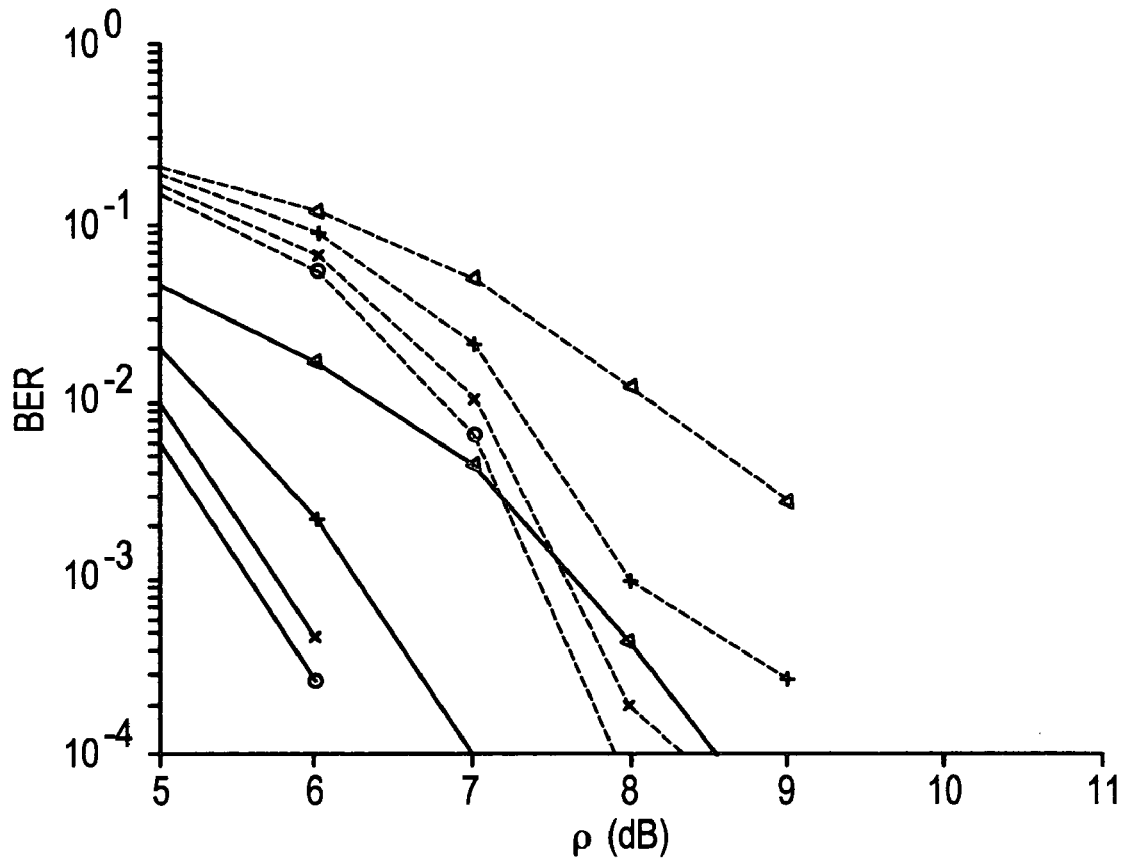
FIG. 10 illustrates BER performance of a turbo MIMO receiver employing the deterministic SMC MIMO demodulator, where iterative channel estimation is based on pilots and the decoded symbols with high reliability.
Figure 11:
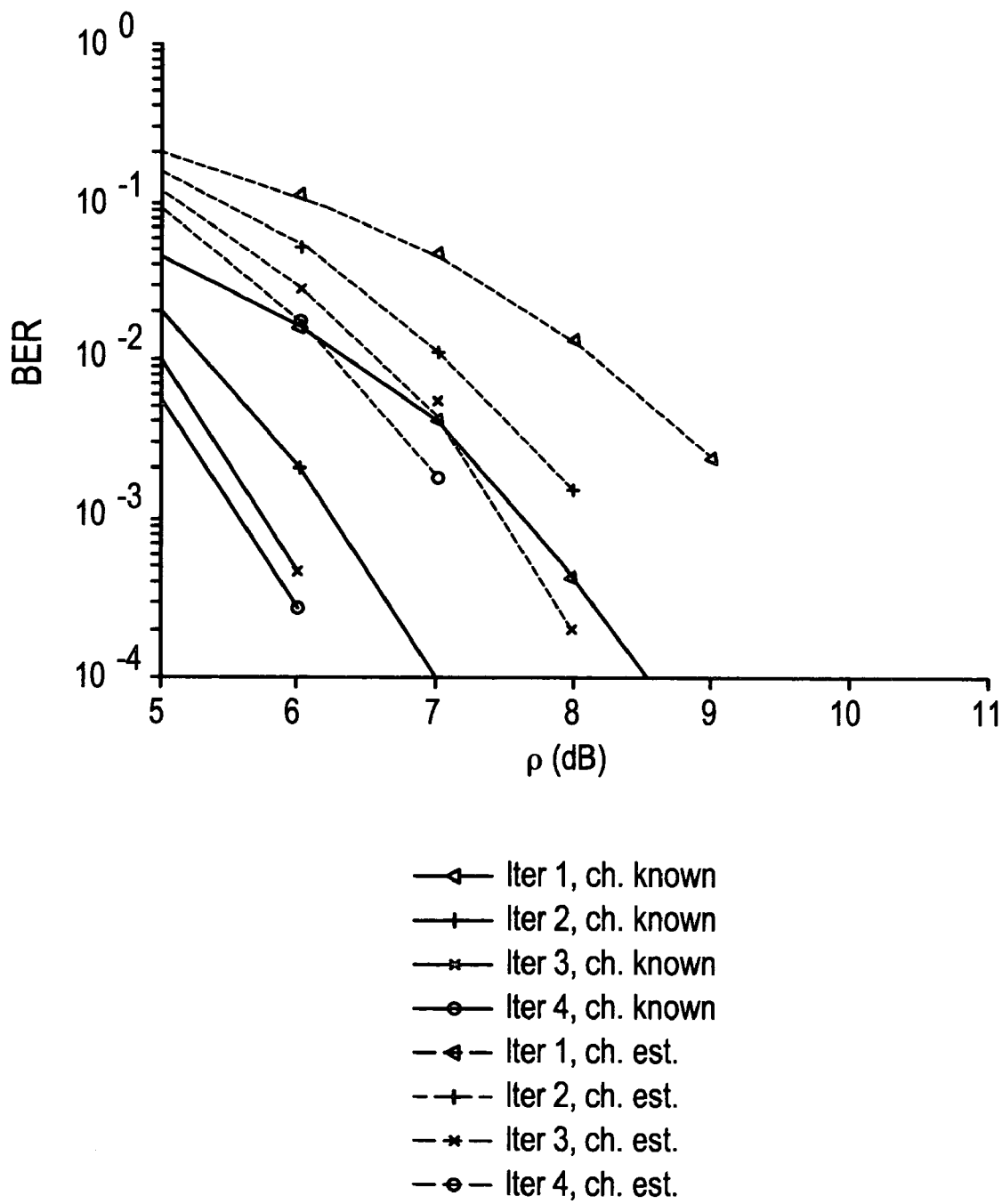
FIG. 11 illustrates BER performance of a turbo MIMO receiver employing the deterministic SMC MIMO demodulator, where genie-aided channel estimation is based on pilots and all information symbols.

The corresponding BER performance of a turbo receiver employing the deterministic SMC demodulator is shown in FIGS. 9, 10 and 11. It is seen that the deterministic SMC algorithm offers improved and more stable performance than its stochastic counterpart.

6 Conclusions

The invention provides a new family of demodulation algorithms particularly useful for soft-input soft-output MIMO demodulation. These new techniques illustratively use the conventional BLAST detection based on simple nulling and cancellation as the kernel, and are based on the sequential Monte Carlo (SMC) method for Bayesian inference. Two versions of such SMC MIMO demodulation algorithms are developed, based on respectively stochastic and deterministic sampling. As hard MIMO detection algorithms, the proposed SMC demodulation algorithms significantly outperform all existing BLAST detection methods. Moreover, the deterministic SMC MIMO detector slightly outperforms the sphere decoding algorithm. Furthermore, in coded MIMO systems, the proposed SMC algorithms can naturally serve as the soft MIMO demodulator in a turbo receiver. Simulation results indicate that overall the deterministic SMC MIMO demodulator offers better and more stable performance compared with its stochastic counterpart in both the uncoded and the coded MIMO systems.

The invention has been described herein with reference to particular exemplary embodiments. Certain alterations and modifications may be apparent to those skilled in the art, without departing from the scope of the invention. The exemplary embodiments are meant to be illustrative, not limiting of the scope of the invention, which is defined by the appended claims.

APPENDIX—LIST Of REFERENCES

[1] G. J. Foschini and M. J. Gans. On the limits of wireless communications in a fading environment when using multiple antennas. *Wireless Personal Commun.*, 6(3):311-335, 1998.

[2] I. E. Telatar. Capacity of multi-antenna Gaussian channels. *Euro. Trans. Telecommun.*, 10(6):585-595, November 1999.

[3] C. N. Chuah, D. N. C. Tse, J. M. Kahn, and R. A. Valenzuela. Capacity scaling in MIMO wireless systems under correlated fading. *IEEE Trans. Inform. Theory*, 48(3):637-650, March 2002.

[4] P. W. Wolniansky, G. J. Roschini, G. D. Golden, and R. A. VAlenzuela. V-BLAST: an architecture for realizing very high data rates over the rich-scattering wireless channel. In *Proc. 1998 Int. Symp. Sig. Sys. Elect. (ISSSE'98)*, Pisa, Italy, September 1998.

[5] G. J. Foschini. Layed space-time architecture for wireless communication in a fading environment when using multi-element antennas. *Bell Labs. Tech. J*, 1(2):41-59, 1996.

[6] G. D. Golden, G. J. Foschini, R. A. Valenzuela, and P. W. Wolniansky. Detection algorithm and initial laboratory results using V-BLAST space-time communication architecture. *Elect. Let.*, 35:14-16, January 1999.

[7] O. Damen, A. Chkeif, and J. Belfiore. Lattice code design for space-time codes. *IEEE Commun. Let.*, 4(5):161-163, May 2000.

[8] B. M. Hochwald and S. T. Brink. Achieving near-capacity on a multiple-antenna channel. *Submitted to IEEE Trans. Commun.*, April 2002.

[9] A. M. Chan and I. Lee. A new reduced sphere decoder for multiple antenna systems. In *Proc. 2002 Int. Commun. Conf (ICC'02)*, New York, N.Y., April 2002.

[10] A. Doucet, N. DeFreitas, and N. J. Gordon (eds.). *Sequential Monte Carlo Methods in Practice*. New York: Springer-Verlag, 620 pp., 2001.

[11] X. Wang, R. Chen, and J. S. Liu. Monte Carlo Bayesian signal processing for wireless communications. *J. VLSI Sig. Proc.*, 30(1-3):89-105, Jan.-Feb.-March 2002.

[12] R. Chen, X. Wang, and J. S. Liu. Adaptive joint detection and decoding in flat-fading channels via mixture Kalman filtering. *IEEE Trans. Info. Theory*, 46(6):2079-2094, September 2000.

[13] R. Chen and J. S. Liu. Sequential Monte Carlo methods for dynamic systems. *J Amer. Stat.Assoc.*, 93:1302-1044, 1998.

[14] R. Chen and J. S. Liu. Mixture Kalman filters. *J Amer. Stat. Assoc. (B)*, 62:493-509, 2000.

[15] Z. Yang and X. Wang. A sequential Monte Carlo blind receiver for OFDM systems in frequency-selective fading channels. *IEEE Trans. Sig. Proc.*, 50(2):271-280, February 2002.

[16] A. M. Tonello. On turbo equalization of interleaved space-time codes. In *Proc. 2001 Fall Vehi. Tech. Conf (VTC-fall'01)*, October 2001.

[17] H. Dai and A. F. Molisch. Multiuser detection for interference-limited MIMO systems. In *Proc. 2001 Spring Vehi. Tech. Conf (VTC-spring'01)*, May 2002.

[18] M. Sellathurai and S. Haykin. TURBO-BLAST for wireless communications: theory and experiments. *IEEE Trans. Sig Proc.*, 50(10):2538-2546, October 2002.

[19] X. Wang and H. V. Poor. Iterative (Turbo) soft interference cancellation and decoding for coded CDMA. *IEEE Trans. Commun.*, 47(7):1046-1061, July 1999.

[20] L. R. Bahl, J. Cocke, F. Jelinek, and J. Raviv. Optimal decoding of linear codes for minimizing symbol error rate. *IEEE Trans. Info. Theory*, 20(3):284287, March 1974.

[21] T. L. Marzetta. BLAST training: estimation channel characteristics for high-capacity spacetime wireless. In *Proc. 37th Annual Allerton Conf Commun., Comput. & Control*, Sep. 1999.

[22] Q. Sun, D. C. Cox, A. Lozano, and H. C. Huang. Training-based channel estimation for continuous flat fading BLAST. In *Proc. 2002 Int. Conf Commun. (ICC'02)*, New York, N.Y., April 2002.

[23] A. Doucet, S. J. Godsill, and C. Andrieu. On sequential Monte Carlo sampling methods for Bayesian filtering. *Stat. & Comp.*, 10(3): 197-208, 2000.

[24] N. J. Gordon, D. J. Salmond, and A. F. M. Smith. Novel approach to nonlinear non-Gaussian Bayesian state estimation. In *1993 IEE Proc., F. Radar Sonar and Navigations*, 140(2), April 1993.

[25] G. Kitagawa. Monte Carlo filter and smoother for non-Gaussian nonlinear state space models. *J Comput. Graph. Statist.*, 5(1):1-25, 1996.

What is claimed is:

1. A method for demodulating data from a multiple-input multiple-output (MIMO) channel, comprising:
receiving a priori probability values for symbols transmitted across the MTNO channel, said a priori probability values are represented by $P(s_k=a_i)$, where the symbols in a symbol interval are represented by $s_k$, and k is an index identifying a transmit antenna; and $a_i$ is an ith value in an alphabet set from which the symbols take their values;

in accordance with the a priori probability values, determining a set of Monte Carlo samples of the symbols weighted with respect to a probability distribution of the symbols; and estimating a posteriori probability values for the symbols based on the set of Monte Carlo samples.

2. The method of claim 1, wherein:
the Monte Carlo samples comprise stochastic Monte Carlo samples.

3. The method of claim 1, wherein:
the probability distribution of the symbols is represented by p(s|z), where s is a vector of transmitted signal values for different transmit antennas in a symbol interval, and z is a vector of received signals from the different transmit antennas after nulling.

4. The method of claim 1, wherein determining the set of Monte Carlo samples of the symbols in a symbol interval, represented by $\{(s_k^{(j)}, w_k^{(j)})\}$, comprises:

determining a trial sampling density for each ith value, $a_i$, in an alphabet set A from which the symbols take their values, using the a priori probability value $P(s_k=a_i)$ from a previous iteration, where the symbols are represented by $s_k$, and k is an index identifying a transmit antenna;

drawing the jth sample symbol $s_k^{(j)}$, from the alphabet set A, where j=1,2, . . . ,m, and m is a number of the Monte Carlo samples determined for the symbol interval; and computing an importance weight $w_k^{(j)}$ for $s_k^{(j)}$.

5. The method of claim 4, further comprising:
performing resampling to obtain updated importance weights $w_k^{(j)}$.

6. The method of claim 4, further comprising:
initializing the importance weights $w_{-1}^{(j)}=1$.

7. The method of claim 1, wherein:
m is a number of the Monte Carlo samples determined for a symbol interval;

the Monte Carlo samples are represented by $\{(s_k^{(j)}, w_k^{(j)})\}$, each a posteriori probability value $P(s_k=a_i|z)$ is obtained from $$P(s_k = a_i | z) = \frac{1}{W_k} \sum_{j=1}^{m} 1(s_k^{(j)} = a_i) w_k^{(j)}, a_i \in A$$

where
z is a vector of received signals from different transmit antennas after nulling;

the symbols are represented by $S_k$, where k is an index identifying a transmit antenna;

importance weights for the symbols $S_k$ are represented by $w_k$;

A is an alphabet set from which the symbols take their values, and $a_u$ is an ith value in A;

$$W_k \triangleq \sum_{j=1}^{m} w_k^{(j)};$$

and
1 is an indicator function defined by $$1(x = a) = \begin{cases} 1, \text{if } x = a, \\ 0, \text{if } x \neq a. \end{cases}$$

8. The method of claim 1, further comprising:
based on the a posteriori probability values, calculating a posteriori log-likelihood ratios of interleaved code bits.

9. The method of claim 1, wherein:
the Monte Carlo samples comprise deterministic Monte Carlo samples.

10. The method of claim 1, wherein determining the set of Monte Carlo samples of the symbols in a symbol interval, represented by $\{(s_k^{(j)}, w_k^{(j)})\}$, comprises:

calculating an exact expression for the probability distribution by enumerating m samples for less than all transmit antennas to obtain m data sequences, where m is a number of the Monte Carlo samples determined for the symbol interval;

computing the importance weight $w_k^{(j)}$ for each symbol $s_k^{(j)}$, where k is an index identifying a transmit antenna; and selecting and preserving m distinct data sequences with the highest weights.

11. A program storage device tangibly embodying a program of instructions executable by a machine to perform a method for demodulating data from a multiple-input multiple-output (MIMO) channel, the method comprising:

receiving a priori probability values for symbols transmitted across the MIMO channel, said a priori probability values being represented by $P(s_k=a_i)$, where the symbols in a symbol interval are represented by $s_k$, and k is an index identifying a transmit antenna; and $a_i$ is an ith value in an alphabet set from which the symbols take their values;

in accordance with the a priori probability values, determining a set of Monte Carlo samples of the symbols weighted with respect to a probability distribution of the symbols; and estimating a posteriori probability values for the symbols based on the set of Monte Carlo samples.

12. A demodulator for demodulating data from a multiple-input multiple-output (MIMO) channel, comprising:

means for receiving a priori probability values for symbols transmitted across the MIMO channel, said a PRIORI probability values being represented by $P(s_k=a_i)$, where the symbols in a symbol interval are represented by $s_k$, and k is an index identifying a transmit antenna; and $a_i$ is an ith value in an alphabet set from which the symbols take their values;

means for determining, in accordance with the a priori probability values, a set of Monte Carlo samples of the symbols weighted with respect to a probability distribution of the symbols; and means for estimating a posteriori probability values for the symbols based on the set of Monte Carlo samples.

13. The demodulator of claim 12, wherein:
the Monte Carlo samples comprise stochastic Monte Carlo samples.

14. The demodulator of claim 12, wherein:
the Monte Carlo samples comprise deterministic Monte Carlo samples.

15. A method for demodulating data from a channel, the channel comprising a multiple-input multiple-output (MIMO) channel, the method comprising:
(a) receiving a priori probability values for symbols transmitted across the channel;
(b) in accordance with the a priori probability values, determining a set of deterministic Monte Carlo samples of the symbols in a symbol interval, represented by $\{s_k^{(j)}, w_k^{(j)}\}$, weighted with respect to a probability distribution of the symbols, by:
  (b1) calculating an exact expression for the probability distribution by enumerating m samples for less than all transmit antennas to obtain m data sequences, where m is a number of the deterministic Monte Carlo samples determined for the symbol interval;
  (b2) computing the importance weight $w_k^{(j)}$ for each symbol $s_k^{(j)}$, where k is an index identifying a transmit antenna; and
  (b3) selecting and preserving m distinct data sequences with the highest weights; and
(c) estimating a posteriori probability values for the symbols based on the set of deterministic Monte Carlo samples; wherein:
(d) the probability distribution of the symbols is represented by p(s|z), where s is a vector of transmitted signal values for different transmit antennas in a symbol interval, and z is a vector of received signals from the different transmit antennas after nulling.

16. A method for demodulating data from a channel, the channel comprising a multiple-input multiple-output (MIMO) channel, the method comprising:
(a) receiving a priori probability values for symbols transmitted across the channel;
(b) in accordance with the a priori probability values, determining a set of deterministic Monte Carlo samples of the symbols in a symbol interval, represented by $\{(s_k^{(j)}, w_k^{(j)})\}$, weighted with respect to a probability distribution of the symbols, by:
  (b1) calculating an exact expression for the probability distribution by enumerating m samples for less than all transmit antennas to obtain m data sequences, where m is a number of the deterministic Monte Carlo samples determined for the symbol interval;
  (b2) computing the importance weight $w_k^{(j)}$ for each symbol $s_k^{(j)}$, where k is an index identifying a transmit antenna; and
  (b3) selecting and preserving m distinct data sequences with the highest weights;
(c) estimating a posteriori probability values for the symbols based on the set of deterministic Monte Carlo samples; wherein:
(d) wherein the probability distribution of the symbols is represented by p(s|z), where s is a vector of transmitted signal values for different transmit antennas in a symbol interval, and z is a vector of received signals from the different transmit antennas after nulling;
(e) wherein m is a number of the deterministic Monte Carlo samples determined for a symbol interval;
each a posteriori probability value $P(s_k=a_i|z)$ is obtained from $$P(s_k = a_i \mid z) = \frac{1}{W_k} \sum_{j=1}^{m} 1(s_k^{(j)} = a_i) w_k^{(j)}, \ a_i \in A$$

where
  z is a vector of received signals from different transmit antennas after nulling;
  A is an alphabet set from which the symbols take their values, and $a_i$ is an ith value in A;

$$W_k \triangleq \sum_{j=1}^{m} w_k^{(j)};$$

and
1 is an indicator function defined by $$1(x = a) = \begin{cases} 1, & \text{if } x = a, \\ 0, & \text{if } x \neq a, \end{cases}$$

and
(f) calculating, based on the a posteriori probability values, aposteriori log-likelihood ratios of interleaved code bits.

* * * * *